US009913344B2

(12) United States Patent
Lu et al.

(10) Patent No.: US 9,913,344 B2
(45) Date of Patent: Mar. 6, 2018

(54) METHOD OF CONFIGURING LIGHTING EFFECT PATTERNS FOR INTERACTIVE LIGHTING EFFECT DEVICES

(71) Applicant: LUMIC TECHNOLOGY INC., Zhubei (TW)

(72) Inventors: Ying-Ko Lu, Zhubei (TW); Ta-Wei Huang, Zhubei (TW); Ta-Jen Lin, Zhubei (TW); Chih-Ming Chang, Zhubei (TW); Wen-Chih Wang, Zhubei (TW)

(73) Assignee: LUMIC TECHNOLOGY INC., Zhubei (TW)

( * ) Notice: Subject to any disclaimer, the term of this patent is extended or adjusted under 35 U.S.C. 154(b) by 0 days.

(21) Appl. No.: 15/413,435

(22) Filed: Jan. 24, 2017

(65) Prior Publication Data

US 2017/0135165 A1    May 11, 2017

Related U.S. Application Data

(63) Continuation-in-part of application No. 14/822,923, filed on Aug. 11, 2015.

(60) Provisional application No. 62/286,446, filed on Jan. 25, 2016.

(51) Int. Cl.
*H05B 33/08*    (2006.01)
*G06K 7/14*    (2006.01)
*H05B 37/02*    (2006.01)

(52) U.S. Cl.
CPC ......... *H05B 33/086* (2013.01); *G06K 7/1417* (2013.01); *H05B 37/0272* (2013.01)

(58) Field of Classification Search
None
See application file for complete search history.

(56) References Cited

U.S. PATENT DOCUMENTS

| 8,544,747 | B2* | 10/2013 | Rowe ....................... G06K 7/12 |
| | | | 235/462.04 |
| 8,866,391 | B2* | 10/2014 | Ganick ................. G01C 21/206 |
| | | | 315/120 |
| 9,141,330 | B2* | 9/2015 | Conti ..................... G06F 3/1446 |
| 9,332,622 | B1* | 5/2016 | Dutt ................... H05B 37/0272 |
| 9,378,404 | B2* | 6/2016 | Rowe |
| 9,392,657 | B2* | 7/2016 | Lee ..................... H05B 33/0842 |

(Continued)

*Primary Examiner* — Crystal L Hammond
(74) *Attorney, Agent, or Firm* — Ding Yu Tan

(57) ABSTRACT

Interactive lighting effect devices configured by an interactive lighting effect control system in an automated wireless manner on a mass scale are provided. RF data bursts are captured to illuminate interactive lighting effect devices selectively in accordance with a matched data. The matched data is formed by combining a pattern-related data of lighting effect extracted from a QR code of the event ticket with an identification address extracted from a QR code of the interactive lighting effect device, the pattern-related data of lighting effect includes a zone code. Improvisational illuminating color control change for any zone assignment for color control signal can be generated and converted to set of RGB color codes to be transmitted by the interactive lighting effect control system for broadcasting as data bursts to the interactive lighting effect devices. Different types of data acquisition interfaces are provided for obtaining the matched data.

20 Claims, 14 Drawing Sheets

(56) References Cited

U.S. PATENT DOCUMENTS

| | | | | |
|---|---|---|---|---|
| 2003/0137258 A1* | 7/2003 | Piepgras | H05B 33/0863 | 315/291 |
| 2005/0194449 A1* | 9/2005 | He | G06K 7/10742 | 235/473 |
| 2006/0097660 A1* | 5/2006 | Scott | H05B 37/029 | 315/291 |
| 2009/0184837 A1* | 7/2009 | De Prycker | G06F 3/1446 | 340/686.1 |
| 2011/0309150 A1* | 12/2011 | Jovanovski | G06K 7/10554 | 235/462.06 |
| 2011/0309151 A1* | 12/2011 | Cudzilo | G06K 7/10564 | 235/470 |
| 2012/0274670 A1* | 11/2012 | Lee | H05B 37/0272 | 345/690 |
| 2012/0312874 A1* | 12/2012 | Jonsson | G06Q 10/087 | 235/385 |
| 2013/0334971 A1* | 12/2013 | Jones | H05B 37/0272 | 315/151 |
| 2014/0113598 A1* | 4/2014 | Conti | G06F 3/1446 | 455/414.1 |
| 2014/0132390 A1* | 5/2014 | Loveland | H05B 37/0227 | 340/5.8 |
| 2014/0239086 A1* | 8/2014 | Wong | B05B 17/08 | 239/18 |
| 2014/0239852 A1* | 8/2014 | Kim | H05B 37/0272 | 315/312 |
| 2014/0354153 A1* | 12/2014 | Pulido, Jr. | H05B 33/0854 | 315/77 |
| 2015/0028096 A1* | 1/2015 | Kim | G06K 7/1439 | 235/375 |
| 2015/0028746 A1* | 1/2015 | Temple | H05B 33/0863 | 315/129 |
| 2015/0053757 A1* | 2/2015 | Williams | G06K 7/10009 | 235/375 |
| 2015/0123887 A1* | 5/2015 | Shadle | G06F 3/14 | 345/102 |
| 2015/0269466 A1* | 9/2015 | Inotay | G06K 19/06037 | 235/494 |
| 2016/0100471 A1* | 4/2016 | Van De Sluis | H05B 37/0227 | 315/152 |
| 2016/0248506 A1* | 8/2016 | Ryan | H04B 10/116 | |
| 2016/0307332 A1* | 10/2016 | Ranjan | H04N 5/2256 | |

* cited by examiner

METHOD OF CONFIGURING LIGHTING EFFECT PATTERNS FOR INTERACTIVE LIGHTING EFFECT DEVICES

FIELD OF THE INVENTION

The present invention generally relates to a method for a process for configuring lighting effect patterns for interactive lighting effect devices and, more particularly, to a process comprising of steps for dynamically and interactively configuring lighting effect patterns for one or more interactive lighting effect devices located at an event venue to produce dynamic and interactive lighting effects on a mass scale.

BACKGROUND OF THE INVENTION

Interactive lighting effective devices, such as, for example, handheld LED glow sticks are popular portable electronic devices used for achieving interactive mass-scaled lighting effects in various venue events or mass gatherings, such as at a musical concert, a sporting event, a mass gathering, a church event, a political gathering, an educational institution convention, when the interactive lighting effect devices are being operated in a coordinated illuminating patterns to produce continuous illuminating visual effects on a mass scale. The interactive lighting effective devices, such as, the handheld LED glow sticks can be remote-controlled wirelessly under radio frequency signal broadcasts, by using a RF transmitter, a lighting controller and a proprietary control software on laptop or PC.

Traditional method of programming or configuring lighting effect patterns and sequences comprising of several steps for an interactive lighting effect device requires to write pattern-related data of lighting effects into a microcontroller (MCU) memory of each of the interactive lighting effect device ahead of time via wired connection such as, i.e. via a USB cable, in accordance with a pre-matched seating information of an user carrying the interactive lighting effect device at a concert venue prior to the interactive lighting effect device is being transported to the venue location. Therefore, in order to achieve a lighting effect performance for an entire venue event having many sophisticated or intricate lighting or illuminating sequences would certainly require to store a large amount of lighting control data inside the MCU memory for matching against the huge number of necessary lighting effect changes. In addition, all of the abovementioned steps for configuring lighting effect patterns/sequences are usually performed for each of the interactive lighting effect device one by one at a factory during the manufacturing phase/process of the interactive lighting effect devices. A set of the pre-programmed lighting effect data may include an identification information for each of the interactive lighting effect device, a corresponding pre-matched seating information assigned to the user carrying the interactive lighting effect device, and a corresponding lighting effect pattern data (which is a sequence of timed light effect data values comprising of specified illumination color for producing corresponding lighting effect). Upon completion of the above-mentioned programming configurations of each of the interactive lighting effect devices, they are required to be transported or shipped to the concert or event venue, whereby they are required to be placed one-by-one by hand at each of many assigned seating locations, respectively, and thus would take up a long time for completion. For example, an interactive lighting effect device with an interactive lighting effect device ID number of 2538491 has been assigned to Zone no. A, Row no. 2, Seat no. 5 and therefore must be placed at that particular seat, while another interactive lighting effect device with the interactive lighting effect device ID number of 2538492 has been assigned and must be placed to Zone no. A, Row no. 2, Seat no. 6, etc. Furthermore, any accidental misplacement or incorrect placement of any lighting effect device, i.e. an interactive light effect device belonging to seating zone B, row 6, seat number 2 misplaced to end up at seating zone B, row 7, seat 2, will lead to a lighting effect show having inferior or deteriorated visual quality by creating illuminating color blotches or anomalies. Moreover, because all of the lighting effect pattern sequence data had already being written into the memory of each interactive lighting effect device ahead of time during the manufacturing phase thereof and also that the configuring/programming of the lighting effect pattern sequence data requires to be performed under a tedious manual process (instead of an efficient automated process) requiring a lot of manpower, as a result, any spontaneous or dynamic illuminating effect changes cannot be realized or updated in time during the lighting effect show at the venue event.

Another conventional method for configuring the lighting effect wristbands has been described in US patent application publication number 20140184386 by Jason Charles Regler et. al, in which each seating zone is assigned a unique zonal address correspondingly-assigned wristbands, and the wristbands are programmed with the corresponding zonal address, with the address thereby allowing a light controller to target banks of wristbands for configuring on a selective sectional basis. However, the interactive lighting effect device, i.e. wristband, taught in the above patent application by Jason Charles Regler still requires to perform a step for pre-configuring or pre-assigning an unique zonal address to each corresponding wristband, and to write the zonal address to the memory thereof, done one by one. Furthermore, human labor is still required to place the wristbands near the corresponding zone region at the venue event, i.e. a kiosk at a particular entry point of the corresponding zone region according to a zone layout, to allow for programming at the point of sale or some other point via internet access. In addition, because the wrists have to be grouped in according to one corresponding zone region at the kiosk, thus severely limiting entry convenience for venue attendees when desiring to reach different zone regions inside the venue event when entering at one entry point.

Therefore, there is a need in the related art in providing a more efficient and flexible method for dynamically configuring lighting effect patterns and sequences for interactive lighting effect devices on a mass scale during a lighting effect show at a venue event.

SUMMARY OF THE INVENTION

The present invention provides an interactive lighting effect control system comprising an event ticket, an interactive lighting effect device, a data acquisition interface, a wireless transmitter, a memory, and a processing unit according to a first embodiment of present invention. A set of matched data is wirelessly transmitted to an assigned interactive lighting effect device comprising of information from the event ticket and the assigned interactive lighting effect device. The matched data are extracted by a first mapping unit and a second mapping unit of the processing unit and wirelessly broadcasted from the wireless transmitter to one or more interactive lighting effect devices via a plurality of the first RF data bursts, and the zone code of pattern—related data of the matched data is successfully configured and stored inside the assigned interactive lighting effect device upon matching the identification address stored in the memory of the assigned interactive lighting effect device with respect to the matched data from the RF data bursts. An illuminating color data is wirelessly broadcasted from the wireless transmitter to one or more interactive lighting effect devices via a plurality of the second RF data bursts, and upon successfully authentication of the assigned interactive light effect device, the controller is configured to cause the assigned interactive lighting effect device to be selectively illuminating in accordance with the illuminating color data of the second RF data burst and matching the one or more zone codes stored in the memory of the assigned interactive lighting effect device.

The present invention provides wireless data transmission in the form of RF data bursts from the wireless transmitter of the interactive lighting effect control system to be intercepted and accessed by a wireless receiver of the interactive lighting effect device.

The present invention provides that a total number of the interactive lighting effect device can be one or more, and that the interactive lighting effect control system can efficiently and effectively manage and handle a large number of the interactive lighting effect devices upwards of a million or more.

The present invention provides the interactive lighting effect device having at least one light source, the controller is configured to cause the at least one light source of the interactive lighting effect device selectively to emit light in accordance with a received illuminating color sequence data for providing continuous automated and coordinated lighting effect.

The present invention provides the received illuminating color sequence data comprising a plurality of prearranged illuminating intensities of red, green and blue light emitting diodes (LEDS) corresponding to the zone codes in sequential data burst timing.

The present invention provides a plurality of light emitting diodes (LEDs) having at least colors of red, green and blue for the light sources in each interactive lighting effect portable light illuminating device, in which illuminating intensity of the red, green and blue LEDS are configured in accordance with red, green and blue color codes (R, G, B) ranging from 0 to 255, respectively.

The present invention provides illuminating states of the light source comprising on, off, or flashing for the interactive lighting effect portable light illuminating device.

The present invention provides two or more interactive lighting effect devices that are capable of receiving the same set of illuminating color and zone assignment data to cause the light sources thereof selectively to be illuminating with the same color.

The present invention provides the zone codes to be assigned for seating location by seating zone.

The present invention provides the set of illuminating color data comprising illuminating intensity of the red, green and blue LEDS corresponding to the zone code.

The present invention provides the interactive lighting effect device in various configurations, such as, for example, a smartphone, an illuminating LED wristband, an illuminating LED necklace, a handheld LED glow stick, an LED bangle, a LED bracelet, a glowing head band, a glowing eyewear, or a set of LED gloves.

The present invention provides an interactive lighting effect control system configured and adapted for use together with the interactive lighting effect devices, in which the interactive lighting effect control system is a mobile device, such as smartphone, which includes a camera serving as data acquisition interfaces, and also contains a wireless transmitter, a memory, and a processing unit therein according to a second embodiment.

The at least one lighting controller generating a color control signal, in which the color control signal comprising an illuminating color and zone assignment data. The lighting controller is coupled to the memory of the wireless transmitter, the color control signal is transmitted from the lighting controller to the wireless transmitter, and the wireless transmitter is an RF transmitter configured to broadcast the color control signal in a plurality of the second RF data bursts in sequential order. The at least one wireless receiver is configured to intercept and respond to the second RF data bursts broadcasted from the wireless transmitter upon verifying the authenticity thereof.

The present invention provides the interactive lighting effect control system to be broadcasting color control signal in the second RF data bursts to the interactive lighting effect device, upon receiving of the second RF data burst for the color control signal by the interactive lighting effect device, a controller therein performing authentication verification of an identification code (i.e. the identification code mentioned here can be provided by the Checksum or CRC (Cyclic Redundancy Check) byte of the color control signal) from the received second RF data burst of the color control signal and inspecting whether the identification code of the color control signal after calculation is correct or not, and upon recognizing the identification code to be correct, initiating change of illuminating color of a plurality of LEDs in the interactive lighting effect device in accordance with the color control signal comprising a plurality of illuminating color and zone assignment data for a plurality of light sources of the interactive lighting effect portable light illuminating devices defined by a set of red, green, and blue (R, G, B) color codes.

The present invention provides the identification address for each interactive lighting effect device according to a preferred embodiment to be the media access control address (MAC address) of the interactive lighting effect device. Since each interactive lighting effect device has an unique MAC address, overall data transmission security for the interactive lighting effect control system can be enhanced.

The present invention provides the identification address for each interactive lighting effect device according to an another embodiment to be a 6 bytes key for the interactive lighting effect device. Since each interactive lighting effect device has an unique 6 bytes key, overall data transmission security for the interactive lighting effect control system can be further enhanced.

The present invention provides optionally one or more repeaters to be configured and adapted to be used increase a transmission coverage area of RF data bursts thereof.

The present invention provides redundant RF data bursts to be sequentially broadcasted at the time $t_n$ and at the time $t_{n+1}$ comprising of the same redundant zone code signal in consecutive RF data bursts to the interactive lighting effect device, for ensuring data transmission integrity.

The present invention provides redundant RF data bursts to be sequentially broadcasted at the time $t_n$ and at the time $t_{n+1}$ comprising of the same redundant color control signal in consecutive RF data bursts to the interactive lighting effect device, for ensuring data transmission integrity.

The present invention provides a method of a process comprising of steps using the interactive lighting effect control system for dynamically configuring lighting effect patterns and sequences for the interactive lighting effect device which can be located at an venue event to produce dynamic lighting effects on a mass scale.

The method for dynamically configuring lighting effect patterns and sequences and/or zone codes for the interactive lighting effect device at a venue event to produce dynamic lighting effects on a mass scale according to embodiments of present invention demonstrates the following characteristics or features: (a) the data for the lighting effect patterns and sequences and/or zone code can be adapted specifically or tied to each of the interactive lighting effect devices through RF data burst data transmissions; (b) technical endeavors encompassed by embodiments of present invention include at least: (i) providing wireless configuration (through RF data bursts from the wireless transmitter) and (in a manner of speaking) "remote-controlling" of portable electronic devices (i.e. interactive lighting effect device) to set up lighting effect operations using an interactive lighting effect control system that is comprising of one or more physical and tangible pieces of equipment, i.e. for example, a MCU, laptop PC, DMX controller, RF receiver, etc., (ii) enhancing the operating efficiency, performance capability and functionality of the interactive lighting effect devices themselves during a lighting effect show, (iii) automating the configuration process of each of the interactive lighting effect device occurring before and during a lighting effect show so as to ensure more efficient and versatile usage thereof, (iv) capable of providing improved dynamic or improvisational lighting effects changes for the interactive light effect devices occurring in real time during a concert performance using the embodiments of present invention for improving overall event patron or attendee experience, and also (v) the interactive lighting effect devices together with the interactive lighting effect control system can be seen also as belonging to the technical endeavor called internet of things (IoT), whereby RF solutions are integrated to provide for the wireless connectivity thereof.

The present invention provides a method for dynamically wirelessly configuring zone code to each of the interactive lighting effect devices through RF data bursts upon completion of authentication of the interactive light effect device.

Some of the advantages of the interactive lighting effect device configured to be operating in an integrated and coordinated illuminating environment to produce continuous dynamic visual effects on a mass scale using the interactive lighting effect control system of present invention, include: (a) reducing configuration cost and improving efficiency for configuring of each interactive lighting effect device to be ready for usage prior to each lighting effect show; (b) none of pre-programmed LED illumination light control sequences as well as the zone code according to seating location need to be pre-stored inside the memory of any interactive lighting effect device ahead of time before an lighting effect show/presentation; (c) a lighting effect performance for an entire venue event having plenty of sophisticated or intricate illuminating sequences would only a small amount of zone code data to be pre-stored in the memory of the interactive lighting effect device for implementing various surprise or improvisational lighting changes; (d) any lighting or illumination change can be integrated on the fly on top of or manually overriding the pre-programmed LED illumination sequences at any time using a DMX lighting controller; (e) having more efficient and convenient zone assignment capability for each interactive lighting effect device using the interactive lighting effect control system.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of the embodiments of this invention are presented herein for purpose of illustration and description only. It is not intended to be exhaustive or to be limited to the precise form disclosed.

Several terms or phrases are used throughout the present disclosure with the following definitions, such as: "ID of the interactive lighting effect device" can be defined as the identification address or MAC address of the interactive lighting effect device. "Identifying address" is defined to be a specified ID code, hardware address or assigned channel that is assigned or preset for the interactive lighting effect device, so as to allow the interactive lighting effect device to be able to be responsive to the RF signal from wireless transmitter by using this "identification address" data. "Pattern of lighting effect" is defined to be one kind of lighting pattern that is shown or produced by means of one group of interactive lighting effect devices illuminated with one particular illuminating color on their LEDs, while another group of interactive lighting effect devices are illuminated with a different illuminating color on their LEDs, and both groups of interactive lighting effect devices can be detectable or visually distinguished as a lighting pattern visually. "Pattern-related data of lighting effect" is defined as a set of data designed for enabling/triggering the pattern of lighting effect when seen on a mass scale, while residing inside the interactive lighting effect device when receiving color control signal RF data bursts from a lighting controller. In this invention, pattern-related data comprising one or more zone codes. It is required to write the "pattern-related data of lighting effect" into the memory of every interactive lighting effect devices in advance of a lighting effect show. "Matched data" is defined as a set of combined data that is comprising of combining some pattern-related data of lighting effect that are mapped from seating location with respect to the corresponding identifying address mapped from the ID of the interactive lighting effect device.

Figure 1A:
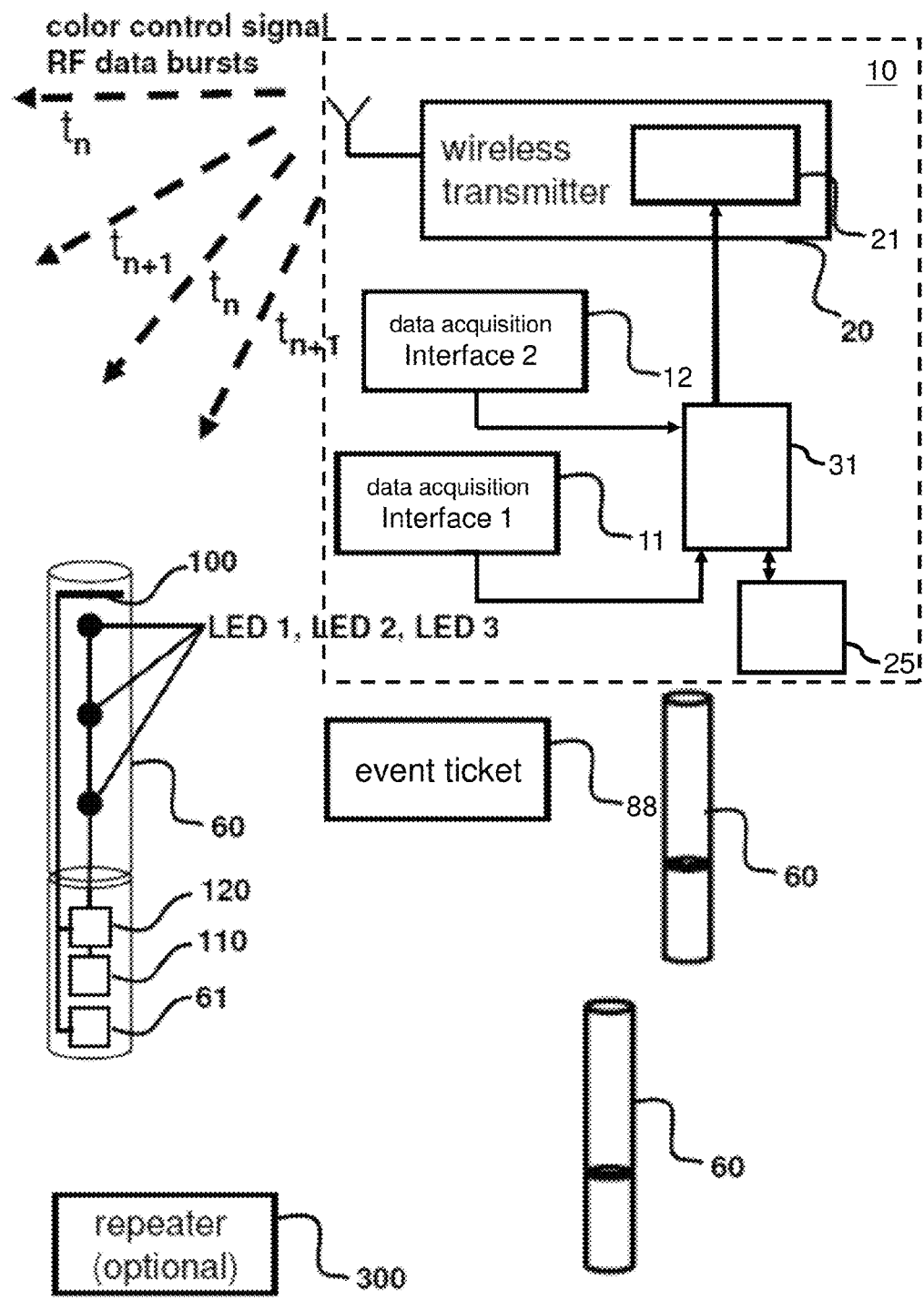
FIGS. 1A-1B show block diagrams of an interactive lighting effect control system configured to be working together with a plurality of interactive lighting effect portable light illuminating devices and a plurality of event tickets in accordance to a first embodiment of present invention.
Figure 1B:
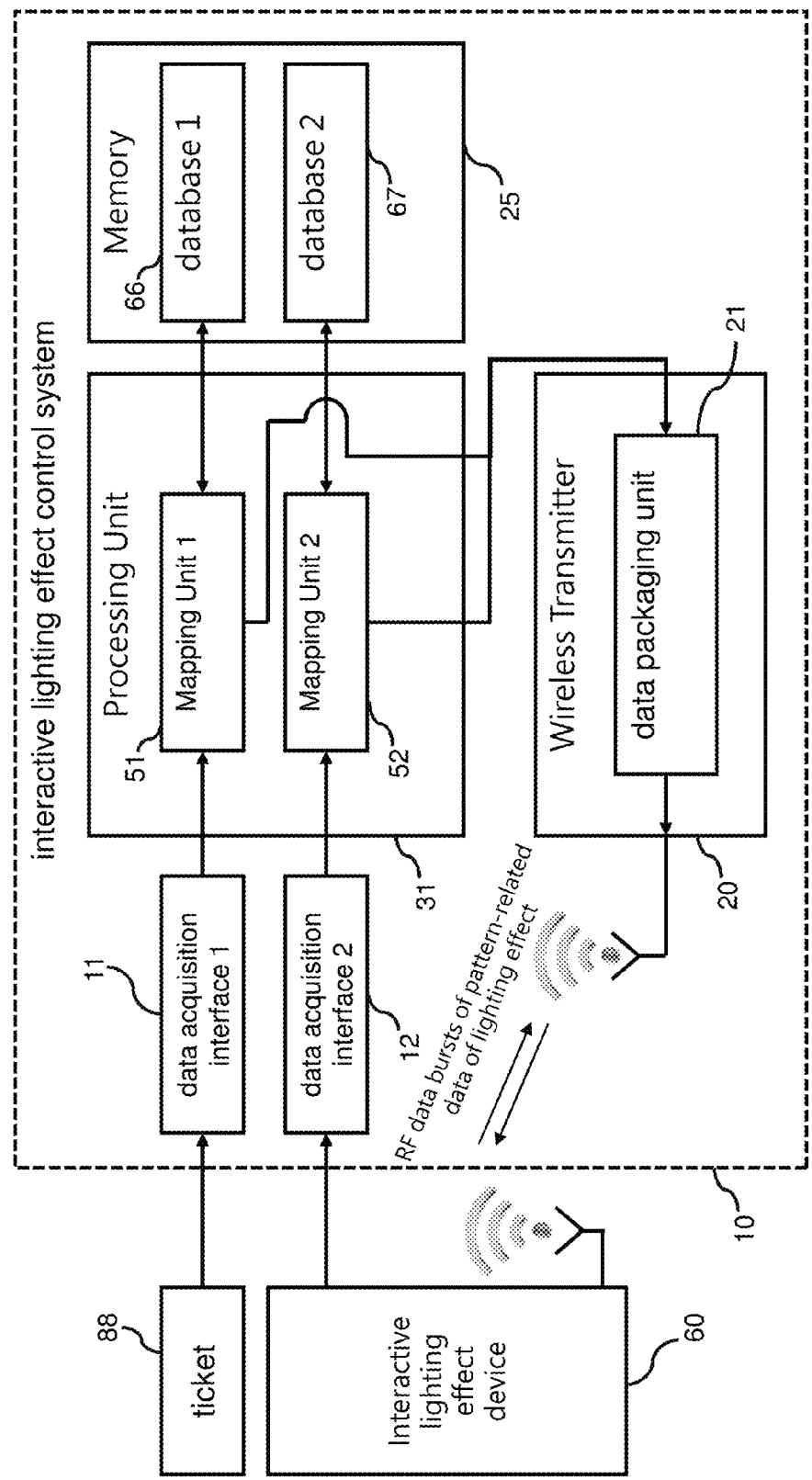

As shown in a block diagram in FIGS. 1A-1B, an interactive lighting effect control system 10 (which can be referred to as a programming system, for short) configured and adapted for use together with a plurality of interactive lighting effect devices 60 and one or more event tickets 88 in accordance with a first embodiment of present invention is shown. The interactive lighting effect control system 10 includes a first data acquisition interface 11, a second data acquisition interface 12, a wireless transmitter 20, a memory 25, and a processing unit 31. The wireless transmitter 20 can be realized or provided by an RF transmitter chip together with other accessory electronic components, such as, for example, Texas Instrument model number CC2541 or CC2500 RF transceiver. The first data acquisition interface 11 and the second data acquisition interface 12 can be a QR code/barcode scanner, respectively. Alternatively, a RFID reader or NFC reader can be used as the data acquisition interface for extracting RFID data or NFC data from a RFID tag configured onto the event ticket and/or the interactive lighting effect device, respectively. In alternative embodiment, the first data acquisition interface 11 and the second data acquisition interface 12 can be the same QR code/barcode scanner, or the same data acquisition interface. A QR code/barcode on the event ticket can be read and captured by the first data acquisition interface 11, and a QR code/barcode sticker on each of the interactive lighting effect devices 60 can be read and captured by the second data acquisition interface 12. The processing unit 31 includes a first mapping unit 51 and a second mapping unit 52. The data captured from the first data acquisition interface 11 and the second data acquisition interface 12 are sent to the first mapping unit 51 and to the second mapping unit 52, respectively. Processed data from the first mapping unit 51 and the second mapping unit 52 are saved in the memory 25 by sending the processed data to a first database 66 and a second database 67 of the memory 25, respectively. In addition, saved data from the memory 25 can be later retrieved by the first mapping unit 51 and the second mapping unit 52, respectively. The wireless transmitter 20 includes a data packaging unit 21. Additional processed data are sent from the first mapping unit 51 and the second mapping unit 52 to the data packaging unit 21 of the wireless transmitter 20. RF data bursts of a pattern-related data of lighting effect can be wirelessly broadcasted to each of the interactive lighting effect devices 60 from the wireless transmitter 20. In the illustrated embodiment of present invention, the processing unit 31 can be a microcontroller or a microprocessor, such as for example, a Silicon Labs 32 bits MCU Cortex M4 which is programmed to control process flows for the first mapping unit 51 and the second mapping unit 52, respectively. Alternatively, the processing unit 31 can be an embedded system, such as, for example, Raspberry Pi, including of additional internet connection to control process flow for the first mapping unit and the second mapping unit. Both of the first mapping unit 51 and the second mapping unit 52 can be part of the programmed flow of the processing unit 31. The first mapping unit 51 and the second mapping unit 52 alternatively can also be realized by two independent MCUs, such as for example, a Silicon Labs 32 bits MCU Cortex M4. Alternatively, the first mapping unit 51 and the second mapping unit 52 can also be realized by two independent embedded system, such as for example, Raspberry Pi. The data packaging unit 21 disposed inside the wireless transmitter 20, can belong as part of the programmed flow of the wireless transmitter 20, or the data packaging unit 21 can be an independent MCU, such as for example, a Silicon Labs 32 bits MCU Cortex M4. In an alternative embodiment, processed data from the first mapping unit 51 and the second mapping unit 52 are sent through internet wirelessly or in a wired manner to be saved on a cloud server (not shown). The cloud server thereby replaces the memory 25. The cloud server also includes a first database 66 and a second database 67 (similar as the memory 25). In addition, saved data from the cloud server can be later retrieved by the first mapping unit 51 and the second mapping unit 52, respectively.

Figure 2:
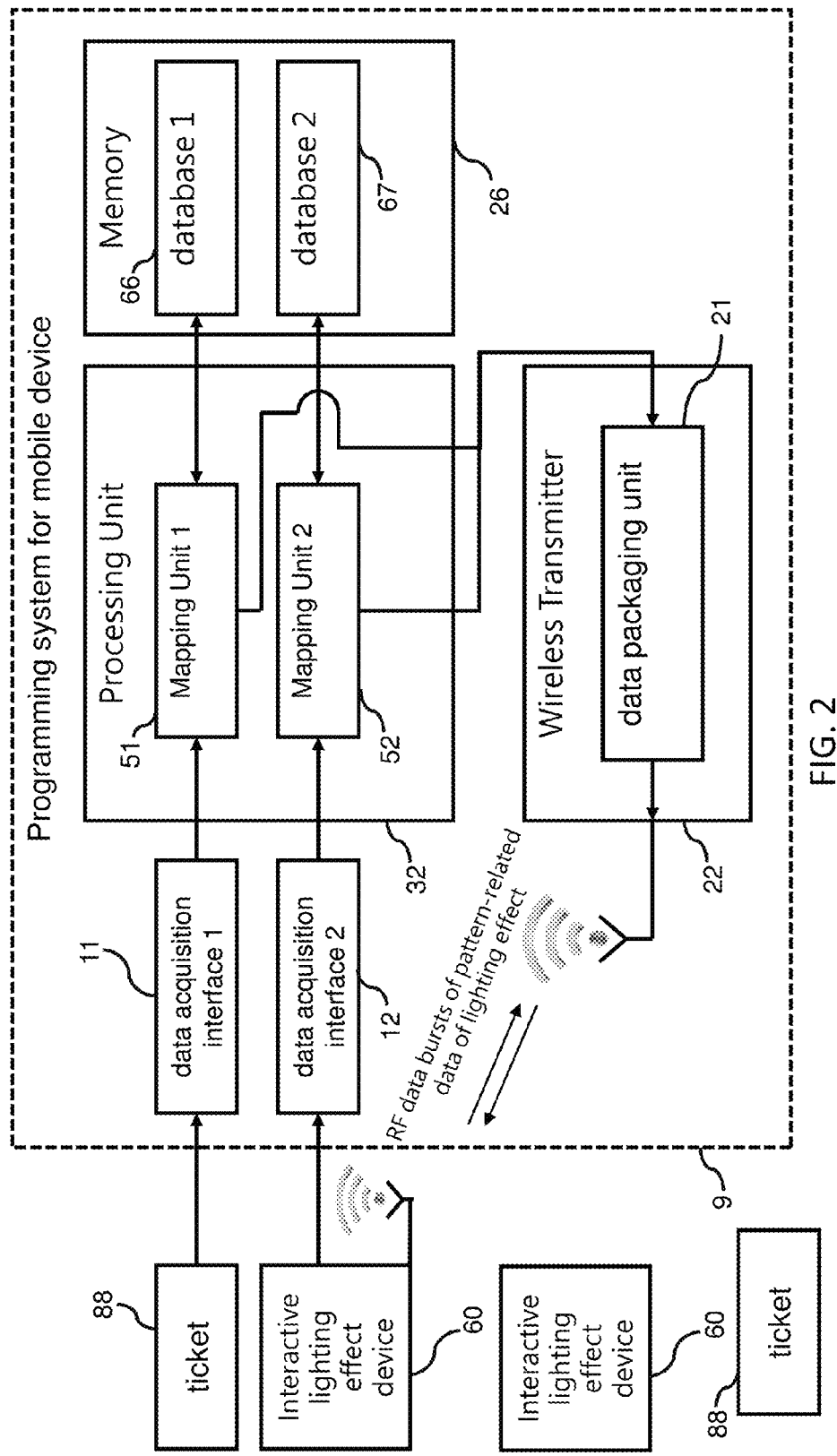
FIG. 2 shows a block diagram of an interactive lighting effect control system configured to be working together with a plurality of interactive lighting effect portable light illuminating devices and a plurality of event tickets in accordance to a second embodiment of present invention.

As shown in a block diagram in FIG. 2, an interactive lighting effect control system (which can be referred to as a programming system for the mobile device, for short) configured and adapted for use together with a plurality of interactive lighting effect devices 60 and one or more event tickets 88 in accordance with a second embodiment of present invention is shown. The interactive lighting effect control system includes a mobile device 9, and the mobile device 9 includes a first data acquisition interface 11, a second data acquisition interface 12, a wireless transmitter 22, a memory 26, and a processing unit 32. The wireless transmitter 22 can be realized or provided by preconfigured RF transmitter chip together with other accessory electronic components disposed inside the mobile device 9. The mobile device 9 can be for example, a smartphone equipped with a camera (not shown) and configured with a QR code/barcode reader app to provide the functions as the first data acquisition interface 11 and the second data acquisition interface 12, respectively. A QR code/barcode (not shown) on the event ticket can be read and captured by the camera of the smartphone 9, and a QR code/barcode sticker (not shown) on each of the interactive lighting effect devices 60 can be read and captured by the camera of the mobile device 9 as well. The processing unit 32 includes a first mapping unit 51 and a second mapping unit 52. The data captured from the first data acquisition interface 11 and the second data acquisition interface 12 are sent to the first mapping unit 51 and to the second mapping unit 52, respectively. Processed data from the first mapping unit 51 and the second mapping unit 52 are saved in the memory 26 by sending the processed data to a first database 66 and a second database 67 of the memory 26, respectively. In addition, saved data from the memory 26 can be later retrieved by the first mapping unit 51 and the second mapping unit 52, respectively. The wireless transmitter 22 includes a data packaging unit 21. Additional processed data are sent from the first mapping unit 51 and the second mapping unit 52 to the data packaging unit 21 of the wireless transmitter 22. RF data bursts of a pattern-related data of lighting effect can be wirelessly broadcasted to each of the interactive lighting effect devices 60 from the wireless transmitter 20. In the illustrated embodiment of present invention, the processing unit 32 can be an application processor of the mobile device, or a microcontroller or a microprocessor (for example, a Silicon Labs 32 bits MCU Cortex M4) to control process flow for the first mapping unit 51 and the second mapping unit 52, respectively. Both of the first mapping unit 51 and the second mapping unit 52 can be part of the programmed flow of the processing unit 32. The data packaging unit 21 disposed inside the wireless transmitter 22, can belong as part of the programmed flow of the wireless transmitter 22. In an alternative embodiment, processed data from the first mapping unit 51 and the second mapping unit 52 can be send through internet wirelessly or in a wired manner to be saved on a cloud server (not shown), the cloud server thereby replaces the memory 26. The cloud server also includes a first database 66 and a second database 67 (similar as the memory 26). In addition, saved data from the cloud server can be later retrieved by the first mapping unit 51 and the second mapping unit 52, respectively.

In addition, referring to the disclosure of U.S. patent application Ser. No. 14/822,923, which is incorporated by reference herein in its entirety, the interactive lighting effect control system can also include a DMX controller (not shown) and a PC/laptop/Phone (not shown). A complete set of illuminating color and zone assignment sequence data for an entire light show can be stored ahead of time of the venue event on the PC/laptop/Phone and/or the DMX controller. The DMX controller and the PC/laptop/phone can be used to provide wireless RF data transmission and illuminating color control process by switch a control mode from a program mode to a DMX control mode so as to be able to send out an improvisational manually-adjusted color control signal or a pre-stored color control signal using the DMX controller. Meanwhile, a color show control algorithm and a color light show program on the PC/laptop/phone can also be used to produce a color control signal. A lighting controller (not shown) generates a color control signal, and the color control signal comprising an illuminating color and zone assignment data 600 (shown in FIG. 3). The lighting controller is coupled to a memory (not shown) and the wireless transmitter (not shown), the color control signal is transmitted to the wireless transmitter. The wireless transmitter is an RF transmitter configured to broadcast the color control signals in a plurality of the second RF data bursts in sequential order. In this illustrated embodiment as well as other embodiments of present invention, a RF receiver 61 is disposed inside an interactive lighting effect device 60.

Referring to FIGS. 1A-1B and 2, the wireless transmitter 20 or 22 initiates sequential broadcasting at a time $t_n$ of one color control signal in one second RF data burst to the interactive lighting effect device 60, and initiating a sequential broadcasting at a time $t_{n+1}$ of another color control signal in another second RF data burst to the interactive lighting effect device 60. Upon receiving of the second RF data burst for the color control signal by the interactive lighting effect device 60, a controller 120 therein performing authentication verification of an identification code (i.e. the identification code can be provided by the Checksum or CRC (Cyclic Redundancy Check) byte of the color control signal) from the received second RF data burst of the color control signal and inspecting to see whether the identification code of the color control signal is deemed correct or not.

Upon successfully performing of authentication and verification of the identification code by the controller 120 of the interactive lighting effect device 60, upon finding match of the zone code, the LED illuminating color can be changed, so as to be initiating change of illuminating color of a plurality of light emitting diodes LED1, LED2, LED3 in the interactive lighting effect device 60 in accordance with the color control signal in the second RF data bursts having different illuminating colors for a plurality of light sources LED1, LED 2, LED3 of the interactive lighting effect devices 60 defined by a set of red, green, and blue (R, G, B) color codes.

Figure 3:
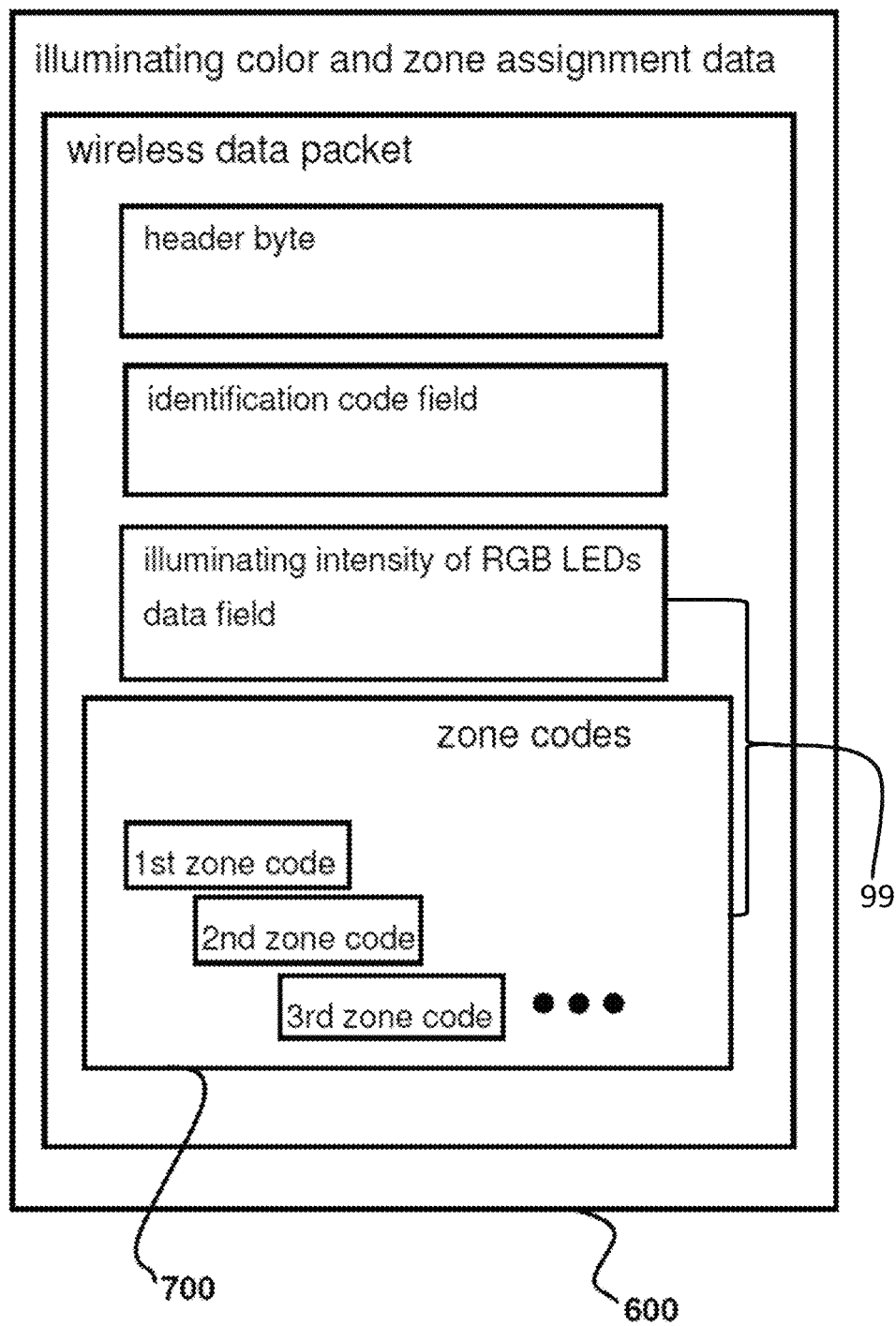
FIG. 3 shows a block diagram of an illuminating color and zone assignment data of a color control signal in accordance with embodiments of present invention.
Figure 4:
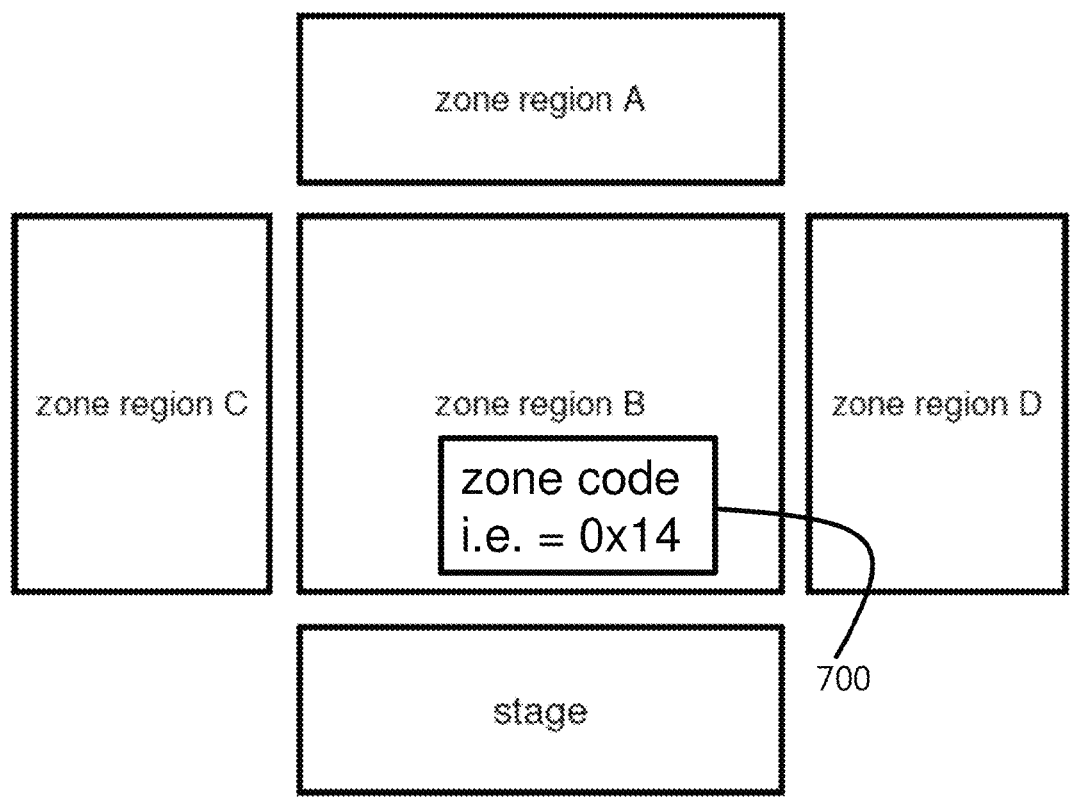
FIG. 4 shows a block diagram of an example of a seating layout at a venue event.

In the second RF data bursts of the illustrated embodiment, the illuminating color and zone assignment data 600, as shown in FIG. 3, includes a wireless data packet comprising of a header byte, an identification code field, an illuminating intensity of red, green and blue light emitting diodes (LED1, LED2, LED3) data field, and a zone code 700 for each illuminating color control signal. The illuminating intensity of RGB LEDs data field sent to the interactive lighting effect devices 60 include red, green, and blue (RGB) color codes ranging in illuminating intensities from 0 to 255, respectively. Examples of illuminating intensity of RGB LEDs are as follow: 255, 0, 0 for a first color code set (Red); 0, 255, 0 for a second color code set (Green); 0, 0, 255 for a third color code set (Blue); and 95, 9, 215 for a fourth color code set (Purple), etc. The above are merely examples, and millions of different illuminating colors for the LEDs can be achieved through different sets of color codes. Referring to FIG. 4, an example of a seating layout at a venue event is shown in a diagram. The zone code 700 of the seating zone can be assigned for seating location by seating zone. Meanwhile, a smallest number of seat that qualifies as a zone region so as to be assigned a zone code (number) can be one. Each seating zone can be allocated to be matched with a numbered zone of an arena, concert hall, or venue event that can be found in a typical seating map or seating chart thereof. Although the seating zone are adopted for many of the embodiments of present invention, nevertheless, the seating zone can be replaced by a standing zone, or in other words, each person can be assigned a specific standing location inside a venue event, because no seats are available, but instead, standing room only is provided for the person.

Figure 5:
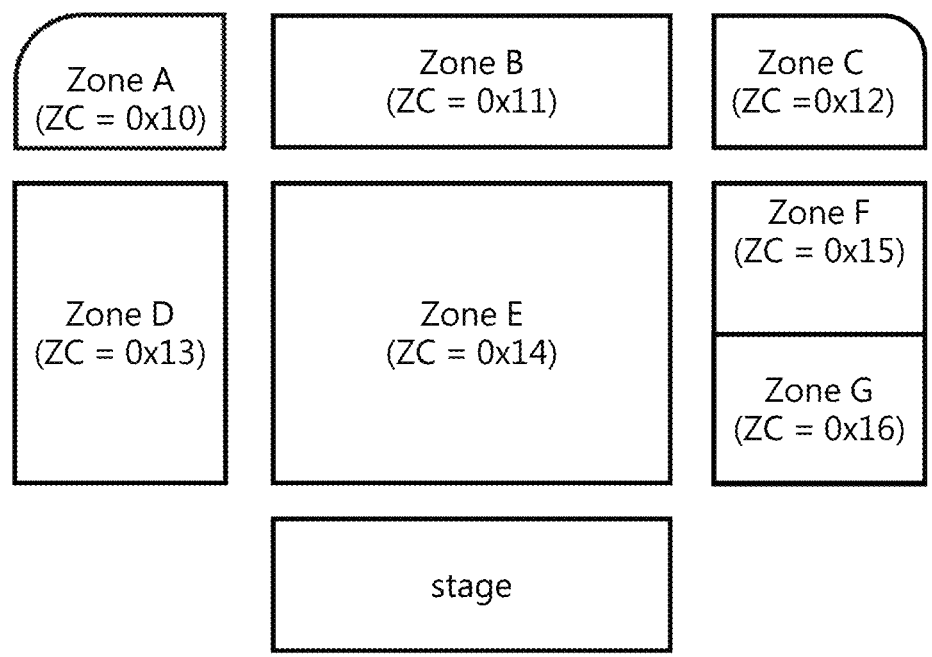
FIG. 5 shows an illustrative example of a layout diagram of zone code allocation arrangement for seating zones according to the embodiments of present invention.

Table 1 below shows an example of a set of zone codes 700 assigned for a plurality of seating locations of different seating zones. In addition, the zone code allocation arrangements or layout for the seating zones in Table 1 below is also shown as a layout diagram at a venue location as shown in FIG. 5 for further clarification. The venue location has a stage for performers to conduct their performances. The layout of each of the seating zone is shown as Zone A, Zone B, Zone C, Zone E, and Zone F. As shown in FIGs Table 1 and FIG. 5, each seating zone has a corresponding unique assigned zone code (ZC).

TABLE 1 zone code example

| Seating zone | Zone code (ZC) |
|---|---|
| Zone A | 0 × 10 |
| Zone B | 0 × 11 |
| Zone C | 0 × 12 |
| Zone D | 0 × 13 |
| Zone E | 0 × 14 |
| Zone F | 0 × 15 |
| Zone G | 0 × 16 |

If R, G and B are set to 255, 0, 0 and ZC is set to 0x10, the interactive lighting effect devices in Zone A will be all illuminated with red color light. The rest of seating zones (Zones B-G) will not response to this color control signal RF data burst. If R, G and B are set to 0, 255, 0; ZC is set to 0x14, the interactive lighting effect devices in Zone E will be all illuminated with green color light. The rest of the seating zones (Zones A-D, F,G) will not response to this color control signal RF data burst.

During the RF data broadcasting process as shown in FIGS. 1 and 2, redundant RF data bursts can be sequentially broadcasted at the time $t_n$ and at the time $t_{n+1}$ comprising of the same redundant color control signal in consecutive RF data bursts to the interactive lighting effect device 60, so as to ensure that if any of the interactive lighting effect device 60 had inadvertently missed or skipped the reception of RF data bursts at the time $t_n$, thus upon successfully receiving the same redundant RF data burst at time $t_{n+1}$ (comprising of the same redundant color control signal), such lag-behind (in receiving RF data burst) interactive lighting effect device 60 can be made to catch up with other interactive lighting effect devices 60 located in the same zone code.

Figure 6:
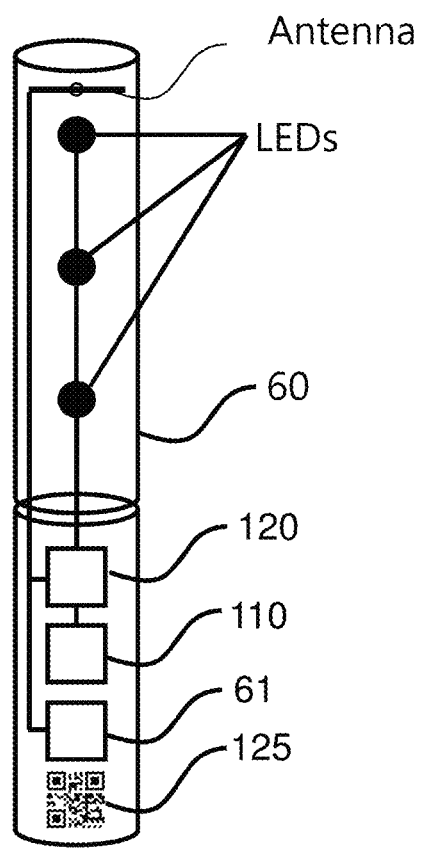
FIG. 6 shows an illustrative diagram of an interactive lighting effect device in accordance to the embodiments of present invention.

Referring to FIGS. 1, 2, and 6, an interactive lighting effect device 60, adapted for use with the interactive lighting effect control system 10 with a wireless transmitter 20 or 22 via wireless data transmissions, is shown. The interactive lighting effect device 60 includes a memory 110 having stored therein at least one zone region indexed by one or more zone codes 700, an RF receiver 61 configured to receive an RF data burst and to capture the RF data burst from the wireless transmitter 20 or 22 of the interactive lighting effect control system 10 upon verifying authenticity of the RF data burst, a controller 120 responsive to the RF data burst, and is coupled to the memory 110, and a QR code/barcode sticker 125. The QR code/barcode sticker 125 can be laminated, attached, or adhesively-adhered onto the interactive lighting effect device 60, as shown in the illustrated embodiment of FIG. 6. The QR code/barcode sticker 125 may show an unique identification information of the interactive lighting effect device 60, in the form of an encrypted data containing the identification address, for the sake of improved security, which can be the MAC address of the interactive lighting effect device 60 upon successful decryption by the interactive lighting effect control system 10, or alternatively, for the sake of improving processing speed and reducing complexity, the QR code/barcode sticker 125 may show the identification address in the form of the MAC address of the interactive lighting effect device 60 can be raw or unencrypted. In alternative embodiments, the QR code/barcode sticker can be replaced by RFID or NFC chip. Because the QR code/barcode sticker 125 can contain encrypted data for the displayed QR code/barcode, thus rendering it more difficult for hackers to try to spoof or take over control by force of the interactive lighting effect device 60. Other information besides the MAC address can also be contained in the QR code/barcode, such as for example, the manufacturing information of the interactive lighting effect device 60, such as date of manufacture, part number, lot number, QC inspection data, location of manufacture, etc. The RF receiver 61 is electrically connected to the antenna 100 and the controller 120, respectively. At least one light source LED1, LED2, LED3 is disposed in the interactive lighting effect device 60. The at least one zone region indexed by the one or more zone codes 700 for each interactive lighting effect device 60 includes a zone code assigned for seating location in one particular seating zone. Thus, the memory 110 of each (particular) interactive lighting effect device 60 has a set of zone codes for the at least one zone regions stored therein to specifically identify and locate that particular interactive lighting effect device 60.

The at least one light source LED1, LED2, LED3 being operationally responsive to the controller 120 to change an illuminating state thereof. The second RF data burst includes at least one set of illuminating color data 99, which can be in the form such as, for example: Example 1: 255, 0, 0, 0x10 (for a set with R, G, B color codes and zone code, respectively). The illuminating color sequence data are the data sequence of a plurality of illuminating color data 99 broadcasted in second RF data bursts in sequence.

The controller 120 is configured to cause the at least one or, for example, three light sources LED1, LED2, LED3 selectively to be illuminating in accordance with the illuminating color data of the second RF data burst and matching the zone code 700 stored in the memory 110 of the interactive lighting effect device 60. Alternatively, the controller 120 can be configured to cause the light sources LED1, LED2, LED3 selectively to emit light in accordance with a received illuminating color sequence data file for providing continuous automated and coordinated lighting effect. The received illuminating color sequence data file is a complete set of illuminating color sequence data that has been configured for an entire light show, which can be stored ahead of time on a laptop or a PC or a DMX controller. The received illuminating color sequence data file includes a plurality of prearranged illuminating intensities for the red, green and blue light emitting diodes (LED1, LED2, LED3) corresponding to the zone codes 700 of the seating location in sequential data burst timing order. Thus, the light emitting diodes LED1, LED2, LED3 are the light sources that are LEDs having at least colors of red, green and blue, in which illuminating intensity of the red, green and blue LEDS are configured in accordance with red, green and blue color codes (ft G, B) ranging from 0 to 255, respectively. In an alternative embodiment, the illuminating intensity of the red, green and blue LEDs further includes a dimmer color code (DIM) ranging from 0 to 255, respectively, and red, green and blue color codes (R1, G1, B1), are respectively determined by: R1=R×DIM/255; G1=G×DIM/255; B1=B×DIM/255.

The set of illuminating color and zone assignment data 600 include illuminating intensity of the red, green and blue LEDS and the zone code 700 of the seating location. Two or more interactive lighting effect devices 60 that are preconfigured with the zone code stored in the memory to be the same are capable of receiving the same set of illuminating color and zone assignment data 600 to cause the light sources selectively to be illuminating in accordance with the same illuminating color data 99, such as for example, when these interactive lighting effect devices 60 are in the same seating zone.

In the embodiments of present invention, the following features or resources are provided: the illuminating states of the light source include on, off, or flashing. In other words, any number of red, green and blue light emitting diodes (LED1, LED2, LED3) can be turned on or powered on, turned off or powered off, or flashing on and off in repeating pattern with a specified frequency (i.e. 2 times per second). Turning on means or entails that at least one of the R, G, B color codes is not zero. Turning off means that all of the R, G, B color codes are set to be zero, or that the dimmer color code is set to zero. The color for the flashing on/off can be set by the corresponding R, G, B color code data. Meanwhile, the flashing frequency can be configured or set by the controller 120 of the interactive lighting effect portable light illuminating device 60 to be given a preset flashing frequency value, i.e. 2 flashings/second, or through generating a random number by the controller 120. The wireless data transmissions from the wireless transmitter to the wireless receiver can be performed by RF data bursts or alternatively, Wi-Fi, Bluetooth or ZigBee transmissions, to name a few. The interactive lighting effect device 60 can be an illuminating LED wristband, an illuminating LED necklace, or a handheld LED glow stick, but is not limited to these options, and can be adapted to other types of illuminating devices with wireless communication capability. In an alternative embodiment, one or more repeaters 300 can be optionally configured and adapted to be used increase a transmission coverage area of RF data bursts thereof for the interactive lighting effect control system 10.

Various methods implemented as processes which comprise of a plurality of steps are provided for initial configuration or wirelessly remote-control of the interactive light effect devices 60 using the interactive lighting effect control system 10 in accordance with embodiments of present invention as described below.

Figure 7:
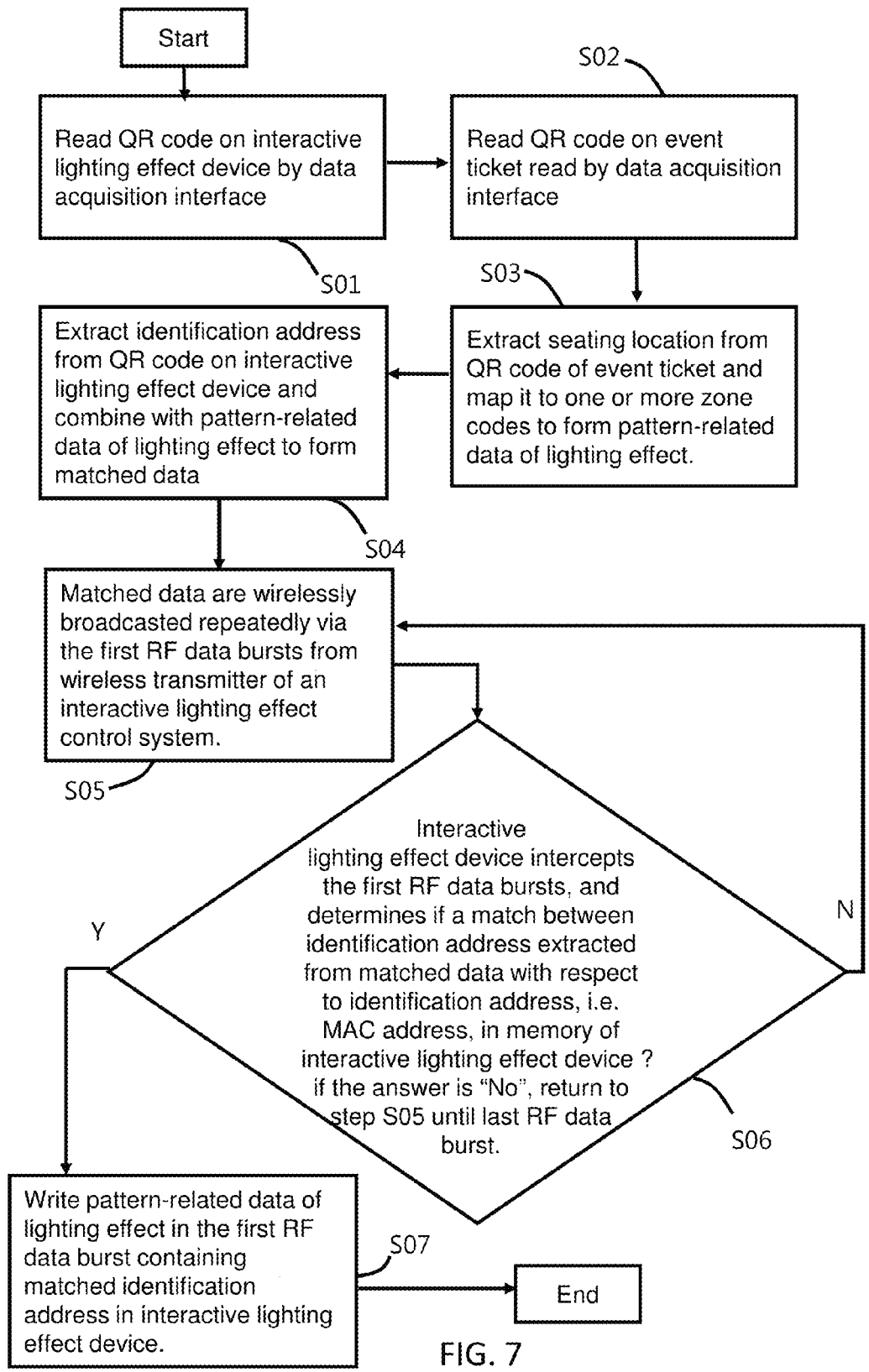
FIG. 7 shows a process flow diagram of a method for configuring an interactive lighting effect device to have seating location information from an event ticket paired with the interactive lighting effect device, and wirelessly installing pattern-related data of lighting effect in the interactive lighting effect device.

As shown in FIG. 7, a method for a process comprising of steps for wirelessly configuring of an interactive lighting effect device to enable the interactive lighting effect device to have seating location information from an event ticket paired with a corresponding interactive lighting effect device, and to have pattern-related data of lighting effect wirelessly installed in the interactive lighting effect device is disclosed in a process flow diagram. In step S01, a QR code/barcode disposed on an interactive lighting effect device is read by a data acquisition interface. In step S02, a QR code/barcode disposed on an event ticket is read by the data acquisition interface (or alternatively, instead of being the same data acquisition interface, it can be a different data acquisition interface). The data acquisition can be a QR code/barcode scanner. In alternative embodiment, instead of reading QR codes/barcodes from the interactive lighting effect device and the event ticket by using the QR code/barcode scanner, a smartphone equipped with a camera and a QR code/barcode reader app can also suffice as the data acquisition interface. Alternatively, a RFID reader or NFC reader can be used as the data acquisition interface for extracting RFID data or NFC data from a RFID tag configured onto the event ticket and/or the interactive lighting effect device, respectively. In step S03, a seating location is then extracted from the QR code/barcode of the event ticket (see step S02), and used to be mapped to one or more zone codes to form a set of pattern-related data of lighting effect. In step S04, an identification address extracted from the QR code/barcode on the interactive lighting effect device is then combined with the (corresponding) set of pattern-related data of lighting effect to form a matched data. For example, by knowing the seating zone, i.e. Zone A, extracted from the ticket, the set of pattern-related data of lighting effect reserved for Zone A can be obtained from an illuminating color sequence data file which contains all of the sets of pattern-related data of lighting effect reserved for all of the seating zones. In step S05, the matched data are then wirelessly broadcasted in a repeated manner via a plurality of the first RF data bursts from a wireless transmitter of an interactive lighting effect control system. Step S05 can be performed either at an entry point to the venue event, so that a venue event personnel can assist in verifying completion of the configuration process of the interactive lighting effect device 60, or alternatively, the attendee in possession of the interactive lighting effect device 60 can be located anywhere inside the venue event, without hindering from further continuation of the entire process. In step S06, each of the interactive lighting effect devices intercepts the first RF data bursts, and determines if there is a match found between the identification address extracted from the matched data in the first RF data burst with respect to (and directly compared to) the identification address, i.e. MAC address, in the memory 110 of the interactive lighting effect device 60 using the controller 120 therein, and if the answer is "Yes" (of successfully finding a match between the two compared identification address), then proceed to step S07, but if the answer is "No" (of not finding a match between the two compared identification address), then repeat step S05 until the first RF data bursts from the interactive lighting effect control system 10 have terminated. In step S07, a pattern-related data of lighting effect in the first RF data burst containing the matched compared identification address are then written or stored in the memory of the interactive lighting effect device. In step S03, the seating location is extracted from the QR code\barcode of the event ticket using the first mapping unit 51 of the processing unit 31, in which the first mapping unit 51 uses the QR code\barcode data to run a mapping algorithm to obtain a set of (mapped) pattern-related data of lighting effect from the first database 66 in the memory 25. In step S04, the identification address is extracted from the QR code\barcode on the interactive lighting effect device using the second mapping unit 52 of the processing unit 31, in which the second mapping unit 52 uses the QR code\barcode data to run a mapping algorithm to obtain the (mapped) identification address from the second database 67 in the memory 25. Later, the data packaging unit 21 combines the pattern-related data of lighting effect and the (matched) identification address to form the matched data. In step S05, the preamble, the header and the CRC check are added to the matched data to be stored in the fourth memory address in the memory 25, and then to be broadcasted to the interactive lighting effect device via the first RF data bursts through the antenna by using the wireless transmitter 20, respectively. In an alternative embodiment, the first mapping unit 51 and the second mapping unit 52 are connected to a cloud server (not shown) and processed data from the first mapping unit 51 and the second mapping unit 52 can be send through internet wirelessly or in a wired manner to be saved on the cloud server (not shown), the cloud server thereby replaces the memory 25. The cloud server also includes the first database 66 and the second database 67 (similar as that of the memory 25). In addition, saved data from the cloud server can be later retrieved by the first mapping unit 51 and the second mapping unit 52, respectively.

Figure 8:
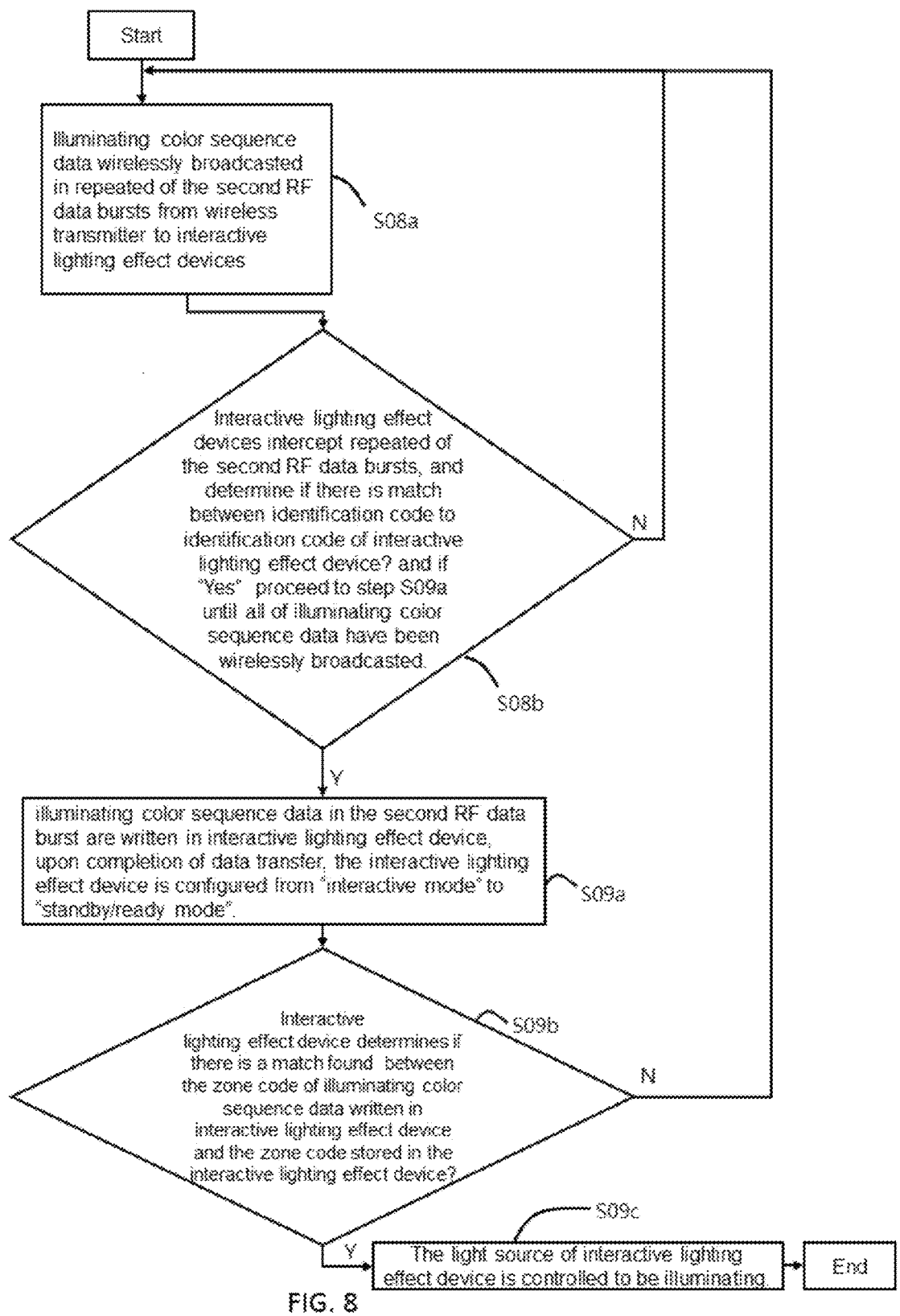
FIG. 8 shows a process flow diagram of a method for writing illuminating color sequence data corresponding to a pattern-related data and causing the at least one light source of the interactive lighting effect devices to be illuminating via the second RF data burst broadcasts in a repeated manner from a wireless transmitter of the interactive lighting effect control system according to an embodiment of present invention.

Referring to FIG. 8, a method for writing (or storing) illuminating color sequence data corresponding to a pattern-related data and causing the at least one light source of the interactive lighting effect devices 60 to be illuminating via the second RF data burst broadcasts in a repeated manner from a wireless transmitter of the interactive lighting effect control system 10 to the interactive lighting effect devices 60 according to an embodiment of present invention is shown in a process flow diagram. In step S08a, a set of illuminating color sequence data corresponding to the pattern-related data of the matched data are then wirelessly broadcasted in a repeated manner via a plurality of the second RF data bursts from the wireless transmitter of the interactive lighting effect control system to the interactive lighting effect devices 60. Step S08a can be performed with the attendee in possession of the interactive lighting effect device 60 located anywhere inside the venue event, without hindering from further continuation of the entire process. Then in step S08b, each of the interactive lighting effect devices intercepts the second RF data bursts, and determines if there is a match found between the identification code extracted from the second RF data burst with respect to (and directly compared to) the identification code, i.e. Checksum or CRC (Cyclic Redundancy Check) byte in the memory 110 of the interactive lighting effect device 60 using the controller 120 therein, and if the answer is "Yes" (of successfully finding a match between the two compared identification codes), then proceed to step S09a, but if the answer is "No" (of not finding a match between the two compared identification codes), then the step S08 is repeated until the second RF data bursts from the interactive lighting effect control system 10 have terminated. In step S09a, the set of illuminating color sequence data in the second RF data burst are then written or stored in the memory of the interactive lighting effect device, then step S08a is repeated until the second RF data bursts from the interactive lighting effect control system 10 have terminated, and upon completion of data transfer, the interactive lighting effect device is thereby configured to be ready for the lighting effect show, i.e. transferring the interactive lighting effect device from "inactive mode" to "standby/ready mode". In step S09b, the interactive lighting effect device determines if there is a match found between the zone code of illuminating color sequence data written in the interactive lighting effect device and the zone code stored in the interactive lighting effect device using the controller 120 therein, and if the answer is "Yes" (of successfully finding a match between the two compared zone codes), then proceed to step S09c, but if the answer is "No" (of not finding a match between the two compared identification codes), then the step S08 is repeated until the second RF data bursts from the interactive lighting effect control system 10 have terminated. In step S09c, the light source of the interactive lighting effect device is controlled to be illuminating by using the controller 120 according to the illuminating color sequence data written in the interactive lighting effect device.

Figure 9:
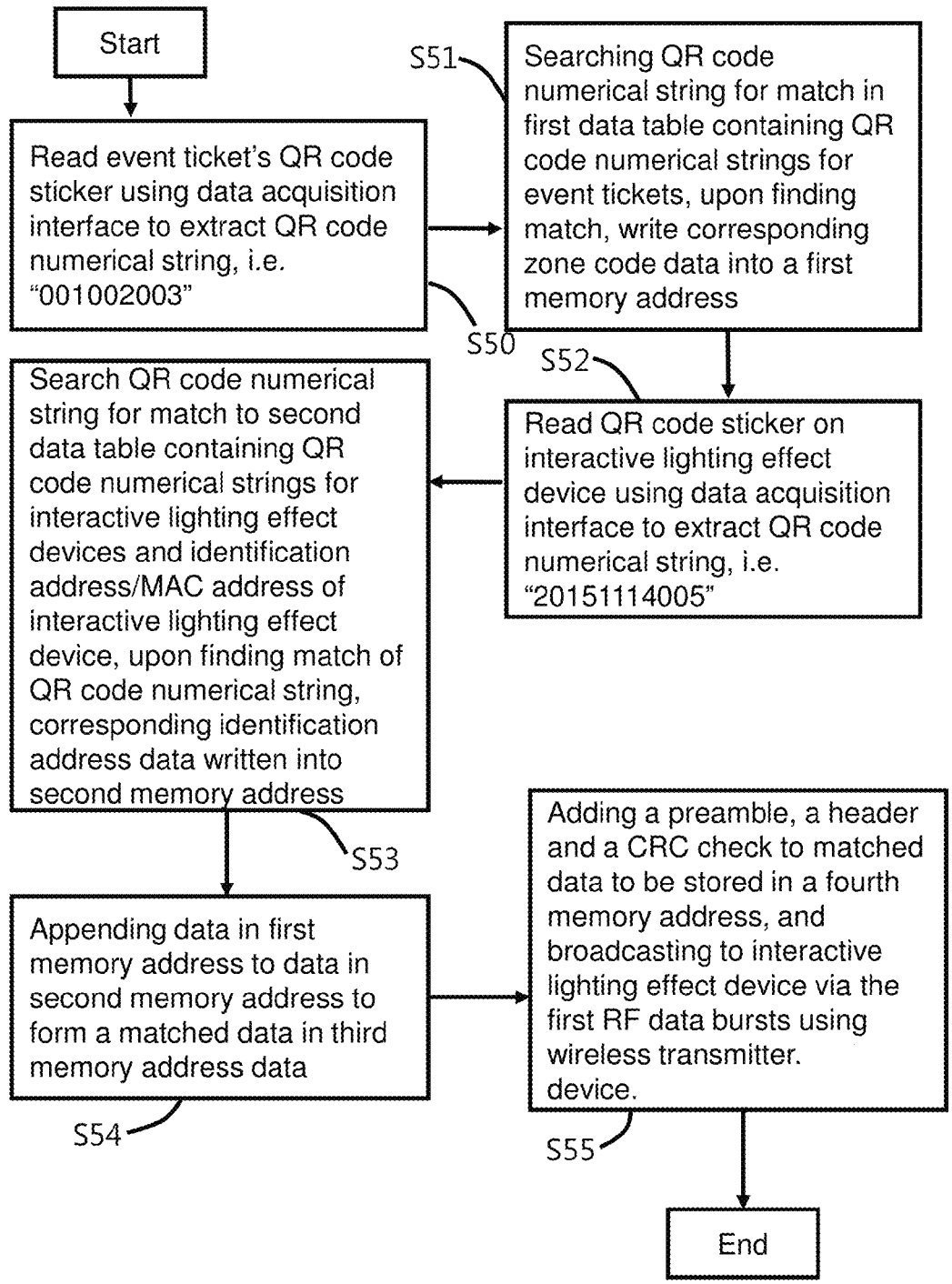
FIG. 9 shows a process flow diagram of a method for generating and broadcasting a matched data by extracting and combining together a zone code data from the event ticket and identification address of the interactive lighting effect device
Figure 10:
FIG. 10 shows an illustrative diagram of an example for an identification address for an interactive lighting effect device obtained using a QR code numerical string or barcode numerical string.
Figure 11:
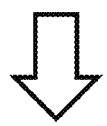
FIG. 11 shows an illustrative diagram of an example of forming of a matched data in a memory address.

Referring to FIGS. 9 and 10, a method for generating and broadcasting a matched data by extracting and combining together one or more zone code data from the event ticket and the identification address of the interactive lighting effect device comprising the following steps is shown. In Step S50, an event ticket's QR code\barcode sticker is read using a data acquisition interface, in which a QR code\barcode numerical string is extracted therefrom, i.e. "001002003" can be the QR code\barcode numerical string of 9 digits in length. In step S51, the QR code\barcode numerical string is searched for a match with respect to a first data table which contains a sequential listing of the following: a plurality of data entries, in which each data entry includes a QR code\barcode numerical string for the event ticket, and a data length, data index, and data content for a zone code, so that the QR code\barcode numerical string can have one or more data entries, i.e. different entries may have different data indexes, i.e. 1-3, and different data contents (in Hex) for the zone code can be for example, i.e. 0x01, 0x02, 0x03, etc. The first data table is securely disposed in the memory 25 of the interactive lighting effect control system 10, so that the corresponding zone codes tabulated with respect to the QR code\barcode numerical strings cannot be illegally extracted by criminals from the data extracted from the QR code\barcode sticker of the event ticket alone, thereby providing extra layer of system security. Upon finding a match of the QR code\barcode numerical string, the corresponding zone code data, with the data content thereof, are written into a first memory address (data index of 1 is for an example of first zone code being 0x01, data index of 2 is for a second zone code being 0x02, and data index of 3 is for a third zone code being 0x03). In step S52, a QR code\barcode sticker on an interactive lighting effect device 60 is read using a data acquisition interface, in which a QR code\barcode numerical string is extracted therefrom, i.e. "20151114005" can be the QR code\barcode numerical string of 11 digits in length. In step S53, the QR code\barcode numerical string is searched for a match with respect to a second data table which contains a sequential listing of the following: a QR code\barcode numerical string for the interactive lighting effect device, and a data length, data index, and data content for an identification address, such as a MAC address, of the interactive lighting effect device 60, so that each QR code\barcode numerical string for the interactive lighting effect device 60 can have only identification address data, for the MAC address of the interactive lighting effect device, as shown in FIG. 10, The data content (in Hex) for the identification address data can be for example, the MAC address for the interactive lighting effect device, i.e. AACCBB (in Hex) etc. The second data table is securely disposed in the memory 25 of the interactive lighting effect control system 10, so that the corresponding identification address data (including the MAC addresses) tabulated with respect to the QR code\barcode numerical string cannot be illegally extracted by criminals from the data extracted from the QR code\barcode sticker of the interactive lighting effect device 60 alone, thereby providing extra layer of system security. Upon finding a match of the QR code\barcode numerical string, the corresponding identification address data, with the data content thereof, are written or copied into a second memory address (i.e. the data content (Hex) of "AACCBB" can be stored in the second memory address as "0x0A", "0x0A", "0x0C", "0x0C", "0x0B, "0x0B"). In step S54, a matched data in a third memory address is formed by combining or appending the data in the first memory address (containing the zone code data extracted from the QR code\barcode of the event ticket) to the data in the second memory address (containing data content of the identification address data extracted from the QR code\barcode sticker from the interactive lighting effect device), as shown in an example in FIG. 11. In step S55, a preamble, a header and a CRC check are added to the matched data to be stored in a fourth memory address, and then to be broadcasted to the interactive lighting effect device via the first RF data bursts using the wireless transmitter of the interactive lighting effect control system 10.

Figure 12A:
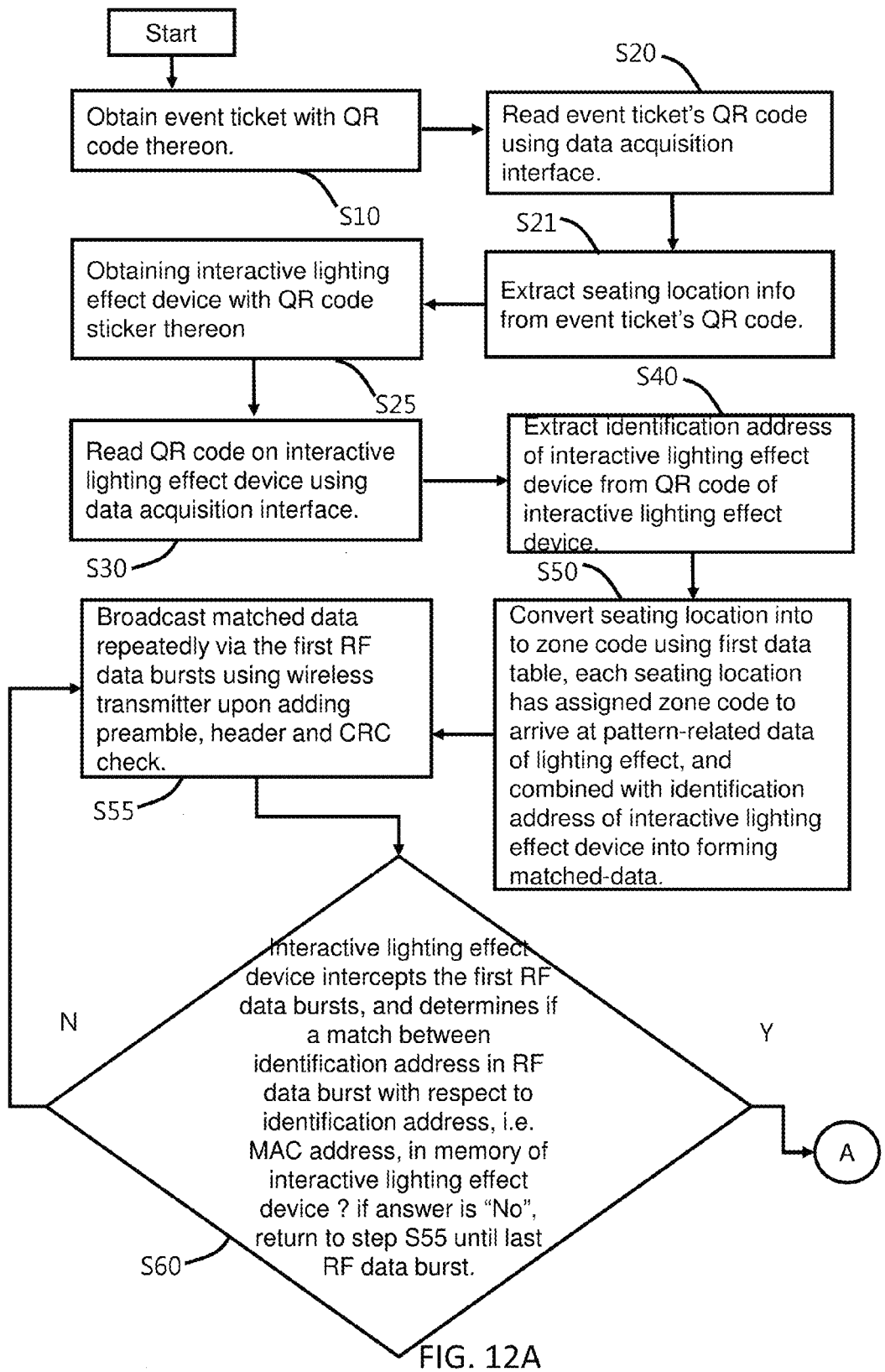
FIGS. 12A-12B shows a process flow diagram of a method for configuring an interactive lighting effect device and causing the at least one light source of the interactive lighting effect devices to be illuminating via wireless RF data burst broadcasts in a repeated manner from a wireless transmitter of the interactive lighting effect control system according to an embodiment of present invention.
Figure 12B:
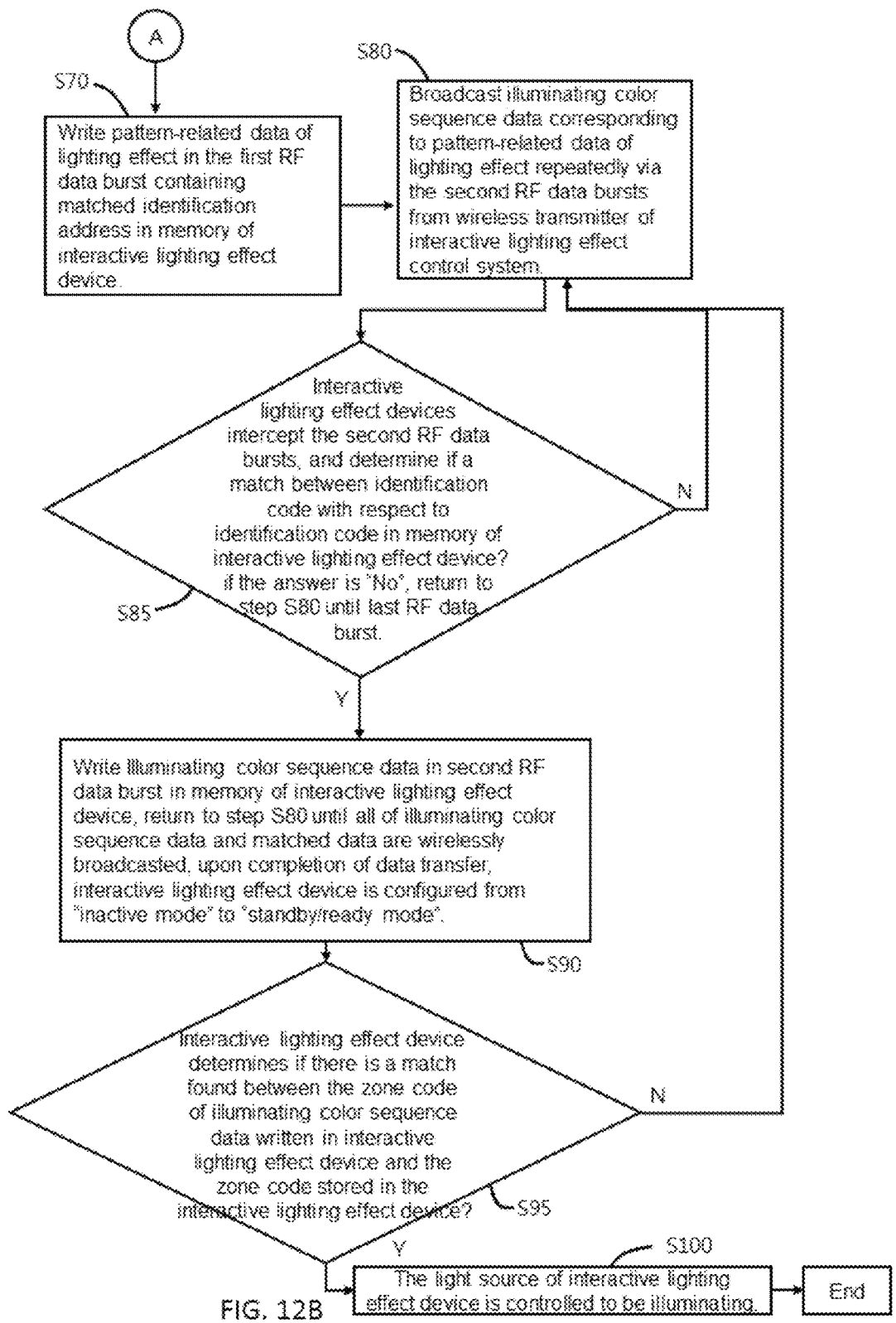

As shown in FIGS. 12A-12B, a method for a process comprising of steps for wirelessly configuring of a plurality of interactive lighting effect devices to enable the interactive lighting effect devices to have seating locations information from an event ticket paired with the corresponding interactive lighting effect devices, respectively, to have pattern-related data of lighting effect wirelessly installed in the interactive lighting effect devices, respectively, and to cause the at least one light source of the interactive lighting effect devices 60 to be illuminating is shown in a process flow diagram. In step S10, a process is initiated by obtaining an event ticket with a QR code\barcode printed thereon. In step S20, a QR code\barcode disposed on an event ticket is read by the data acquisition interface. In step S21, seating location information is then extracted from the QR code\barcode of the event ticket (see step S20). In step S25, obtaining an interactive lighting effect device with a QR code\barcode sticker disposed thereon. In step, S30, a QR code\barcode in the QR code\barcode sticker disposed on the interactive lighting effect device is read by the data acquisition interface. The data acquisition interface can be a QR code\barcode scanner. In alternative embodiment, instead of reading QR codes\barcodes from the interactive lighting effect device and the event ticket by using the QR code\barcode scanner, a smartphone equipped with a camera and QR code\barcode reader can also suffice as the data acquisition interface. Alternatively, a RFID reader or NFC reader can be used as the data acquisition interface for extracting RFID data or NFC data from a RFID tag configured onto the event ticket and the interactive lighting effect device, respectively.

In step S40, identification address of the interactive lighting effect device is then extracted from the QR code\barcode of the interactive lighting effect device (see step S30). In step S50, the seating location information is converted to zone code data using a first data table, in which each seating location has a corresponding assigned zone code, i.e. a ticket with a ticket QR code\barcode numerical string of "001002003" can have a zone code of "0x02" (disposed in data content) to arrive at a set of pattern-related data of lighting effect, and combined with the identification address of the interactive lighting effect device into a matched-data. In step S55, the matched data are then wirelessly broadcasted in a repeated manner via a plurality of the first RF data bursts from a wireless transmitter of an interactive lighting effect control system, upon adding a preamble, a header and CRC check. In step S60, each of the interactive lighting effect devices intercepts the first RF data bursts, and determines if there is a match found between the identification address extracted from the matched data in the first RF data burst with respect to (and directly compared to) the identification address, i.e. MAC address, in the memory 110 of the interactive lighting effect device 60 using the controller 120 therein, and if the answer is "Yes" (of successfully finding a match between the two compared identification addresses), then proceed to step S70, but if the answer is "No" (of not finding a match between the two compared identification addresses), then repeat step S55 until the first RF data bursts from the interactive lighting effect control system 10 have terminated. In step S70, a pattern-related data of lighting effect in the first RF data burst containing the matched compared identification address are then written in the memory of the interactive lighting effect device. In step S80, a set of illuminating color sequence data corresponding to one of the above pattern-related data of lighting effect are then wirelessly broadcasted in a repeated manner via a plurality of the second RF data bursts from the wireless transmitter of the interactive lighting effect control system. Step S80 can be performed with the attendee in possession of the interactive lighting effect device 60 located anywhere inside the venue event, without hindering from further continuation of the entire process. In step S85, each of the interactive lighting effect devices intercepts the second RF data bursts, and determines if there is a match found between the identification code extracted from the second RF data burst with respect to (and directly compared to) the identification code, i.e. CRC or checksum in the memory 110 of the interactive lighting effect device 60 using the controller 120 therein, and if the answer is "Yes" (of successfully finding a match between the two compared identification codes), then proceed to step S90, but if the answer is "No" (of not finding a match between the two compared identification codes), then repeat step S80 until the second RF data bursts from the interactive lighting effect control system 10 have reached the last set of illuminating color sequence data corresponding to the last pattern-related data of lighting effect. In step S90, the set of illuminating color sequence data in the wireless second RF data burst are then written or stored in the memory of the interactive lighting effect device, then repeat step S80 until the second RF data bursts from the interactive lighting effect control system 10 have terminated, and upon completion of data transfer, the interactive lighting effect device is thereby configured to be ready for the lighting effect show, i.e. transferring the interactive lighting effect device from "inactive mode" to "standby/ready mode" In step S95, the interactive lighting effect device determines if there is a match found between the zone code of illuminating color sequence data written in the interactive lighting effect device and the zone code stored in the interactive lighting effect device using the controller 120 therein, and if the answer is "Yes" (of successfully finding a match between the two compared zone codes), then proceed to step S100, but if the answer is "No" (of not finding a match between the two compared identification codes), then the step S80 is repeated until the second RF data bursts from the interactive lighting effect control system 10 have terminated. In step S100, the light source of the interactive lighting effect device is controlled to be illuminating by using the controller 120 according to the illuminating color sequence data written in the interactive lighting effect device.

A method for receiving wireless RF data bursts at the interactive lighting effect devices can be implemented using the method shown in flow chart diagram of FIG. 4 of U.S. application Ser. No. 14/822,923, with a slight modification being that the zone codes can be just a single data string, instead of being in nested hierarchical form. For the sake of brevity, redundant disclosure thereof has been omitted.

In the first embodiment of present invention, the processing unit can be a microcontroller or a microprocessor, such as for example, a Silicon Labs 32 bits MCU Cortex M4 which is programmed to control process flow for the first mapping unit and the second mapping unit. In the same embodiment, alternatively the processing unit can be an embedded system, such as, for example, Raspberry Pi, including of additional internet connection to control process flow for the first mapping unit and the second mapping unit.

In the second embodiment of present invention, the processing unit can be an application processor of the mobile device, or a microcontroller or a microprocessor (for example, a Silicon Labs 32 bits MCU Cortex M4) to control process flow for the first mapping unit and the second mapping unit. In addition, the first mapping unit, the second mapping unit, the first database, the second database, and the data packaging unit perform the same function and steps as those for the first embodiment.

In the third embodiment of present invention, the processing unit can be the application processor of the mobile device, or an embedded system, such as for example, Raspberry Pi, to control the process flow for the first mapping unit and the second mapping unit.

In the embodiments of present invention, both of the first mapping unit and the second mapping unit can be part of the programmed flow of the processing unit. In the first and the second embodiments, the first mapping unit and the second mapping unit can also be two independent MCUs, such as for example, the Silicon Labs 32 bits MCU Cortex M4. Alternatively, the first mapping unit and the second mapping unit can also be two independent embedded system, such as for example, Raspberry Pi.

In the embodiments of present invention, the data packaging unit disposed inside the wireless transmitter, can belong as part of the programmed flow of the wireless transmitter, or the data packaging unit can be an independent MCU, such as for example, the Silicon Labs 32 bits MCU Cortex M4.

In the embodiments of present invention, the data transferring unit can be disposed inside the processing unit, belonging to be part of the programmed flow of the process unit. Alternatively, the data transferring unit can be a microcontroller or a microprocessor, such as for example, the Silicon Labs 32 bits MCU Cortex M4. Alternatively, the data transferring unit can be an embedded system, such as for example, Raspberry Pi, including of additional internet connection.

In the above embodiments of present invention, during a typical RF data transmission session during a venue event, sometimes due to the occurrence of localized RF signal interference or signal blocking, some of the RF data bursts may not be correctly detected or received by the corresponding RF receivers of the interactive lighting effect devices, in the form such as illuminating LED wristbands, illuminating LED necklace or handheld LED glow sticks. Therefore, redundant RF data bursts can be sequentially broadcasted at a time $t_n$ of one color control signal in one RF data burst to the interactive lighting effect device, and then at a time $t_{n+1}$ of the same redundant color control signal in another RF data burst to the interactive lighting effect device consecutively, so as to ensure that if the previous time $t_n$ broadcasted RF data burst had been dropped or skipped due to whatever reason it may be, the RF receiver (in question) can be ensured to "catch up" with other adjacent RF receivers located in the same zone region.

In an alternative embodiment, a data, such as a QR code\barcode on an interactive lighting effect device, read by the data acquisition interface for the mapping unit can be directly used as the matched data without being mapped by the mapping unit, when the QR code\barcode thereof contains both a seating location information, i.e. in zone code data, as well as a pattern-related data of lighting effect.

In an alternative embodiment, wireless transmission from the wireless transmitter can also be provided under Zigbee, WiFi, other RF proprietary, or Bluetooth technology, instead of conventional wireless RF data transmission protocol.

In the above embodiments of present invention, the data acquisition interface can be of the same device for obtaining QR code\barcode readings from the interactive lighting effect devices and the venue ticket, respectively.

In the above embodiments of present invention, overall data and system security thereof is further ensured by keeping the information of the MAC address of each interactive lighting effect device under higher degree of data protection, such as in a secured computer, or kept under encryption in a secured server environment in the cloud, so that such well protected MAC address data thereof can be used to precisely identify and control each of the corresponding interactive lighting effect devices.

In the above embodiments of present invention, the interactive lighting effect devices configured to be operating in an integrated and coordinated illuminating environment to produce continuous dynamic visual effects on a mass scale using the corresponding interactive lighting effect control system offer at least the following advantages or benefits to the general public: (a) achieving a light show performance for an entire venue event having plenty of sophisticated or intricate illuminating sequences would only a small amount of zone code data to be pre-stored in the memory for implementing various surprise or improvisational lighting changes; (b) any lighting change can be integrated on the fly on top of or manually overriding the pre-programmed LED illumination sequences at any time using a DMX lighting controller; (c) allowing for improved scalability and usage deployment on a larger scale through the use of end-to-end wireless configuration of a massive number of interactive lighting effect devices, and adding one or more repeaters for increasing the coverage range of the RF data transmission; (d) reducing configuration cost and improving efficiency for configuring of each interactive lighting effect device to be ready for usage prior to each lighting effect show; (e) none of pre-programmed LED illumination light control sequences as well as the zone code according to seating location need to be pre-stored inside the memory of any interactive lighting effect device ahead of time before an lighting effect show/presentation; (f) having more efficient and convenient zone assignment capability for each interactive lighting effect device using the interactive lighting effect control system; (g) allows for improved convenience, efficiency, and flexibility of dividing the wireless downloading of total amount of data for achieving a complete light show performance into two distinct parts, from a wireless transmitter of an interactive lighting effect control system to a plurality of interactive lighting effect devices via a plurality of RF data bursts, namely, the first part is for writing of a pattern-related data of lighting effect containing matched identification codes in the interactive lighting effect devices, and the second part is for writing illuminating color sequence data containing matched identification codes in the interactive lighting effect devices, and because the first part contains lesser amount of data and is separately downloaded from the second part, the first part can be efficiently and conveniently download at a shorter amount of time and allowing each of the interactive lighting effect device to be set up fully ready for a lighting show at the venue event, meanwhile, subsequently downloading of the second part in a timely manner allows for improvisational illuminating color control changes or lighting changes to take place. In other words, as long as all of the illuminating color sequence data are successfully downloaded in each of the interactive lighting effect devices fully ready before each actual lighting or illuminating sequence, respectively, during the lighting show, thus all of the corresponding illuminating color sequence data do not have to be all downloaded ahead of time before the lighting show at the venue event While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An interactive lighting effect device adapted for use with a venue ticket having a QR code thereon and an interactive lighting effect control system containing a wireless transmitter via wireless data transmission, the interactive lighting effect device, comprising:
a memory having stored therein a zone region indexed by a zone code and an identification address;
a wireless receiver configured to receive an RF data burst and to capture the RF data burst from the wireless transmitter of the interactive lighting effect control system upon verifying authenticity of the RF data burst;
a controller responsive to the RF data burst, and is coupled to the memory;
a QR code sticker comprising a QR code; and
at least one light source disposed therein, the at least one light source being operationally responsive to the controller to change an illuminating state thereof, wherein wireless data transmission is conducted under a plurality of RF data bursts, the RF data burst comprising a plurality of first data bursts and a plurality of second data bursts, each of the first RF data bursts comprising a matched data, each of the second RF data bursts comprising an illuminating color and zone assignment data, the zone code is configured and stored in the memory upon matching the identification address stored in the memory of the interactive lighting effect device, the controller is configured to cause the at least one light source selectively to be illuminating in accordance with the illuminating color data and matching the zone code stored in the memory, the matched data is formed by combining a pattern-related data of lighting effect extracted from the QR code of the event ticket with an identification address extracted from the QR code of the interactive lighting effect device, wherein the pattern-related data of lighting effect is a set of data comprising the zone code and designed for triggering a pattern of lighting effect when seen on a mass scale while receiving the second RF data bursts containing color control signals from a lighting controller.

2. The interactive lighting effect device of claim 1, wherein the at least one light source comprising a plurality of light emitting diodes (LED) having at least colors of red, green and blue.

3. The interactive lighting effect device of claim 1, wherein illuminating intensity of the red, green and blue LEDS are configured in accordance with red, green and blue color codes (R, G, B) ranging from 0 to 255, respectively; wherein the illuminating color and zone assignment data contained in the each of the second RF data bursts are changed on-the-fly in real-time during a light show by transmitting only one byte of data for red, green, and blue color codes between 0 to 255, respectively for the second RF data burst.

4. The interactive lighting effect device of claim 1, wherein the illuminating intensity of the red, green and blue LEDs further comprising a dimmer color code (DIM) ranging from 0 to 255, respectively, and red, green and blue color codes (R1, G1, B1), are respectively determined by:

$$R1 = R \times DIM/255;$$

$$G1 = G \times DIM/255;$$

$$B1 = B \times DIM/255;$$

wherein the illuminating color and zone assignment data contained in the each of the second RF data bursts are changed on-the-fly in real-time during a light show by transmitting only one byte of data for red, green, blue, and dimmer color codes between 0 to 255, respectively for the second RF data burst.

5. The interactive lighting effect device of claim 1, wherein the illuminating state of the light source comprising on, off, or flashing.

6. The interactive lighting effect device of claim 1, wherein the RF data burst is replaced by wireless data bursts under Wi-Fi, Bluetooth or ZigBee.

7. The interactive lighting effect device of claim 1, wherein two or more thereof that are preconfigured with the zone code stored in the memory thereof to be the same are capable of receiving the same set of pattern-related data for lighting effect to cause the light sources selectively to be illuminating in accordance with a same illuminating color data.

8. The interactive lighting effect device of claim 1, wherein the zone code of the zone region comprising a first zone code assigned for seating location within one seating zone, a second zone code assigned for a plurality of seating zones, and a third zone code assigned for a segment within one seating zone, wherein the first zone code, the second zone code, and the third zone code are identified by the data index, respectively.

9. The interactive lighting effect device of claim 1, wherein the interactive lighting effect device is an illuminating LED wristband, an illuminating LED necklace, an LED bangle, a LED bracelet, a glowing head band, a glowing eyewear, a set of LED gloves, or a handheld LED glow stick.

10. The interactive lighting effect device of claim 1, wherein the interactive lighting effect control system further comprising a data acquisition interface, a memory, and a lighting controller.

11. The interactive lighting effect device of claim 1, wherein each of the first RF data bursts comprising the pattern-related data of lighting effect to be stored in the memory thereof.

12. The interactive lighting effect device of claim 11, wherein upon receiving of the RF data burst, the controller therein performing authentication verification of the identification address from the matched data of the received RF data burst and inspecting to see whether the identification address is matching to the identification address of the interactive lighting effect device.

13. The interactive lighting effect device of claim 12, wherein the identification address for the interactive lighting effect device is a media access control address (MAC address) of the interactive lighting effect device.

14. The interactive lighting effect device of claim 13, wherein upon successfully authenticating of the identification address by the controller, wherein the identification address being the MAC address of the interactive lighting effect device is found to be matching with the MAC address as contained in the matched data of the received RF data burst from the wireless transmitter of the interactive lighting effect control system, then initiating change of illuminating color of a plurality of light sources in the interactive lighting effect device in accordance with a color control signal defined by a set of red, green, and blue (R, G, B) color codes.

15. The interactive lighting effect device of claim 14, wherein the zone code stored in the memory and the zone code in the pattern-related data of lighting effect, are assigned for seating location by a seating zone in a venue event, respectively.

16. The interactive lighting effect device of claim 15, wherein the seating location by the seating zone is replaced by a standing zone, wherein each person is assigned a specific standing location inside the venue event.

17. The interactive lighting effect device of claim 1, wherein the QR code sticker comprising a QR code, the QR code comprising an unique identification information of the interactive lighting effect device in an encrypted data containing the MAC address of the interactive lighting effect device.

18. The interactive lighting effect device of claim 1, wherein the QR code sticker is replaced by a RFID, a NFC chip or a barcode sticker comprising a barcode.

19. A method for generating and broadcasting a matched data to a plurality of interactive lighting effect devices using an interactive lighting effect control system, comprising steps of:
  (a) reading and extracting a QR code numerical string from a QR code sticker on an event ticket using a data acquisition interface;
  (b) searching the QR code numerical string extracted from the event ticket for a match with respect to a first data table, the first data table comprising a sequential listing of a plurality of data entries, each of the data entries comprising a QR code numerical string for an event ticket, and data content for a zone code, respectively, the first data table is disposed in a memory of the interactive lighting effect control system, and upon finding the match of the QR code numerical string from the event ticket with respect to the QR code numerical string from the data entry of the first data table, writing the corresponding data content for the zone code from the data entry into a first memory address;
  (c) reading and extracting a QR code numerical string from a QR code sticker on an interactive lighting effect device using a data acquisition interface;
  (d) searching the QR code numerical string extracted from the QR code sticker on the interactive lighting effect device for a match with respect to a second data table, the second data table comprising a sequential listing of a plurality of data entries, each of the data entries comprising a QR code numerical string for the interactive lighting effect device, and data content for an identification address of the interactive lighting effect device, wherein the data content for the identification address is a MAC address for the interactive lighting effect device, the second data table is disposed in a memory of the interactive lighting effect control system, and upon finding the match of the QR code numerical string from the interactive lighting effect device with respect to the QR code numerical string from the data entry of the second data table, writing the corresponding data content for the identification address from the data entry into a second memory address;
  (e) forming a matched data stored in a third memory address by combining data from the first memory address and the second memory address, comprising of the zone code from the event ticket from the first data table and the identification address of the interactive lighting effect device from the second data table;
  (f) adding a preamble, a header and a CRC check to the matched data to be stored in a fourth memory address; and
  (g) broadcasting data stored in the fourth memory address via a plurality of RF data bursts to the interactive lighting effect devices using a wireless transmitter of the interactive lighting effect control system.

20. A method for wirelessly configuring a plurality of interactive lighting effect devices, comprising at least one light source, using a wireless transmitter, and causing the at least one light source of the interactive lighting effect devices to be illuminating, comprising steps of:
  (a) obtaining an event ticket, the event ticket comprising a QR code printed thereon;
  (b) reading the QR code disposed on the event ticket and extracting seating location information using a data acquisition interface, wherein the data acquisition interface is a QR code scanner;
  (c) obtaining an interactive lighting effect device having a QR code sticker disposed thereon, the QR code sticker having a QR code;
  (d) reading the QR code disposed on the interactive lighting effect device using the data acquisition interface;
  (e) extracting a seating location information from the QR code of the event ticket;
  (f) extracting an identification address of the interactive lighting effect device from the QR code of the interactive lighting effect device;
  (g) converting the seating location information to a zone code data using a first data table to arrive at a set of pattern-related data of lighting effect, and combining with the identification address of the interactive lighting effect device to form a matched data, wherein the matched data comprising of seating location information obtained from the event ticket paired with each of the interactive lighting effect devices;
  (h) wirelessly broadcasting the matched data in a repeated manner via a plurality of first RF data bursts from the wireless transmitter, upon adding a preamble, a header and CRC check thereto;
  (i) intercepting the first RF data bursts by each of the interactive lighting effect devices, and determining if there is a match between the identification address extracted from the matched data in the RF data burst with respect to the identification address stored in the memory of the interactive lighting effect device using the controller therein, and if so, continue to step (j) and if not, return to step (h) until a final RF data burst has been broadcasted;
  (j) writing a pattern-related data of lighting effect in the first RF data burst in the memory of the interactive lighting effect device;
  (k) wirelessly broadcasting a set of illuminating color sequence data corresponding to the pattern-related data of lighting effect in a repeated manner via a plurality of second RF data bursts from the wireless transmitter;
  (l) intercepting the second RF data bursts by each of the interactive lighting effect devices, and determining if there is a match between an identification code of the second RF data burst with respect to the identification code stored in the memory of the interactive lighting effect device using the controller therein, and if so, continue to step (m) and if not, go to step (k) until a final RF data burst has been broadcasted; and
  (m) writing the set of illuminating color sequence data corresponding to the pattern-related data of lighting effect in the memory of the interactive lighting effect device;
  (n) determining if there is a match between the zone code of an illuminating color sequence data written in the interactive lighting effect device and the zone code stored in the interactive lighting controller using the controller therein, and if so, continue to step (o) and if not, go to step (k) until a final second RF data burst has been broadcasted;

(o) Illuminating the at least one light source of the interactive lighting effect device using the controller therein according to the illuminating color sequence data written in the interactive lighting effect device.

* * * * *